Figure 1A:
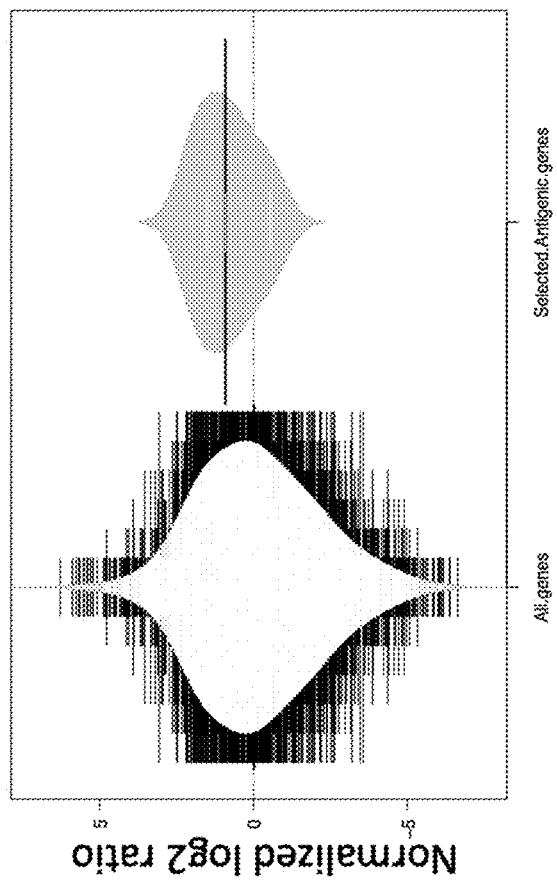

US012491238B2

(12) United States Patent
Mcfadden et al.

(10) Patent No.: US 12,491,238 B2
(45) Date of Patent: Dec. 9, 2025

(54) VACCINE

(71) Applicants: University of Surrey, Surrey (GB); The Secretary of State for Environment, Food and Rural Affairs Acting Through Animal and Plant Health Agency, Surrey (GB)

(72) Inventors: Johnjoe Mcfadden, Surrey (GB); Bernardo Villarreal-Ramos, Surrey (GB); Hans Martin Vordermeier, Surrey (GB); Graham Stewart, Surrey (GB)

(73) Assignees: University of Surrey, Surrey (GB); The Secretary of State for Environment, Food and Rural Affairs Acting Through Animal and Plant Health Agency, Surrey (GB)

( * ) Notice: Subject to any disclaimer, the term of this patent is extended or adjusted under 35 U.S.C. 154(b) by 821 days.

(21) Appl. No.: 17/635,179

(22) PCT Filed: Aug. 14, 2020

(86) PCT No.: PCT/GB2020/051948
§ 371 (c)(1),
(2) Date: Feb. 14, 2022

(87) PCT Pub. No.: WO2021/028697
PCT Pub. Date: Feb. 18, 2021

(65) Prior Publication Data
US 2022/0339275 A1    Oct. 27, 2022

(30) Foreign Application Priority Data
Aug. 14, 2019   (GB) .................................... 1911636

(51) Int. Cl.
| A61K 39/04 | (2006.01) |
| A61K 35/74 | (2015.01) |
| A61P 31/06 | (2006.01) |
| C12N 1/20 | (2006.01) |
| G01N 33/569 | (2006.01) |
| A61K 39/00 | (2006.01) |
| C12R 1/32 | (2006.01) |

(52) U.S. Cl.
CPC .............. *A61K 39/04* (2013.01); *A61K 35/74* (2013.01); *A61P 31/06* (2018.01); *C12N 1/205* (2021.05); *G01N 33/5695* (2013.01); *A61K 2039/522* (2013.01); *C12R 2001/32* (2021.05)

(58) Field of Classification Search
None
See application file for complete search history.

(56) References Cited

U.S. PATENT DOCUMENTS

2009/0263418 A1   10/2009   Speelman-van et al.
2012/0141533 A1    6/2012   Jacobs et al.

FOREIGN PATENT DOCUMENTS

| CN | 101692089 A | * | 4/2010 | |
| WO | WO-2011135369 A1 | * | 11/2011 | ............. A61K 39/04 |
| WO | WO-2013170154 A1 | * | 11/2013 | ............. A61K 39/04 |

OTHER PUBLICATIONS

Chen et al. Journal of Bacteriology, vol. 195 No. 24, pp. 5421-5430, 2013.*
Charlet et al. Molecular Microbiology (2005) 56(5), 1302-1313.*
Gunn et al. University of Idaho, Mar. 2013 retrieved from https://www.uidaho.edu/-/media/UIdaho-Responsive/Files/Extension/publications/pnw/pnw637.pdf?la=en 6 pages.*
Nascimento et al. Scientific Reports, 7:2109 pp. 1-11.*
Chandran et al., "Development of a diagnostic compatible BCG vaccine against Bovine tuberculosis", Scientific Reports, vol. 9, No. 1, Nov. 28, 2019, 11 pages.
GB1911636.7, "Search Report Under Section 17(5)", Feb. 10, 2020, 4 pages.
Mendum et al., "Transposon libraries identify novel *Mycobacterium bovis* BCG genes involved in the dynamic interactions required for BCG to persist during in vivo passage in cattle", BMC Genomics, vol. 20, No. 1, May 28, 2019, 13 pages.
Millington et al., "Rv3615

| Skin Test Group | Antigens |
|---|---|
| A | PPD-B |
| B3 (Triple Fusion) | ESAT6-CFP10 Fusion |
| | MPB70-MPB83 Fusion |
| | Rv3615c-Rv3020c Fusion |
| C | ESAT6-CFP10 Fusion |
| | PBS |
| D | MPB70-MPB83 Fusion |
| E3 | RV3615c-RV3020c Fusion |

| Vaccine | Guinea Pig ID | Right flank Injection Sites | | | Left flank Injection Sites | | |
|---|---|---|---|---|---|---|---|
| | | 1 | 2 | 3 | 4 | 5 | 6 |
| TK/ Vaccine Group 1 (ΔMPB70/83_ ΔRv3615/16_ ΔRv3020) | 53587 | A | B3 | C | D | E3 | A |
| | 46349 | B3 | C | D | E3 | A | B3 |
| | 22385 | C | D | E3 | A | B3 | C |
| | 53970 | D | E3 | A | B3 | C | D |
| | 73412 | E3 | A | B3 | C | D | E3 |
| | 73656 | A | B3 | C | D | E3 | A |
| | 53286 | B3 | C | D | E3 | A | B3 |
| | 46461 | C | D | E3 | A | B3 | C |

| Vaccine | Guinea Pig ID | Right flank Injection Sites | | | | | |
|---|---|---|---|---|---|---|---|
| | | 1 | 2 | 3 | 4 | 5 | 6 |
| WT Danish Control/ Vaccine Group 2 (no knockouts) | 22603 | A | B3 | C | D | E3 | A |
| | 27113 | B3 | C | D | E3 | A | B3 |
| | 46267 | C | D | E3 | A | B3 | C |
| | 53393 | C | D | E3 | A | B3 | C |
| | 73404 | C | A | B3 | C | D | E3 |
| | 22504 | A | B3 | C | D | E3 | A |
| | 53775 | B3 | C | D | E3 | A | B3 |
| | 53446 | C | D | E3 | A | B3 | C |

| Vaccine | Guinea Pig ID | Right flank Injection Sites | | | Left flank Injection Sites | | |
|---|---|---|---|---|---|---|---|
| | | 1 | 2 | 3 | 4 | 5 | 6 |
| Unvaccinated & Challenged Group 3 | 23146 | A | B3 | C | D | E3 | A |
| | 46256 | B3 | C | D | E3 | A | B3 |
| | 74064 | C | D | E3 | A | B3 | C |
| | 66992 | D | E3 | A | B3 | C | D |
| | 53568 | E3 | A | B3 | C | D | E3 |
| | 73358 | A | B3 | C | D | E3 | A |
| | 26639 | B3 | C | D | E3 | A | B3 |
| | 46990 | C | D | E3 | A | B3 | C |

| Vaccine | Guinea Pig ID | Right flank Injection Sites | | | Left flank Injection Sites | | |
|---|---|---|---|---|---|---|---|
| | | 1 | 2 | 3 | 4 | 5 | 6 |
| Unvaccinated & Challenged Group 4 | 46568 | A | B3 | C | D | E3 | A |
| | 73776 | B3 | C | D | E3 | A | B3 |
| | 46761 | C | D | E3 | A | B3 | C |
| | 23009 | D | E3 | A | B3 | C | D |
| | 46343 | E3 | A | B3 | C | D | E3 |
| | 46999 | A | B3 | C | D | E3 | A |
| | 46428 | B3 | C | D | E3 | A | B3 |
| | 44387 | C | D | E3 | A | B3 | C |

*FIG. 11*

Latin Square preliminary analysis

24 hour TST reading

| Vaccine | Treatment | General Linear model ANOVA (P value) | |
|---|---|---|---|
| | | Pre-Challenge | Post-Challenge |
| | | Position on flank: signal of antigen | Position on flank: signal of antigen |
| TK | ΔBCG TK | 0.792 | 0.323 |
| WT BCG | WT BCG strain | 0.339 | 0.889 |
| Unvaccinated + challenged | Unvaccinated | # | 0.362 |
| Unvaccinated + unchallenged | Unvaccinated | # | 0.516 |

Latin Square preliminary analysis

48 hour TST reading

| Vaccine | Treatment | General Linear model ANOVA (P value) | |
|---|---|---|---|
| | | Pre-Challenge | Post-Challenge |
| | | Position on flank: signal of antigen | Position on flank: signal of antigen |
| TK | ΔBCG TK | 0.762 | 0.072 |
| WT BCG | WT BCG strain | 0.642 | 0.074 |
| Unvaccinated + challenged | Unvaccinated | # | NA |
| Unvaccinated + unchallenged | Unvaccinated | # | 0.451 |

Figure 12

VACCINE

This application is the National Stage of International Application No. PCT/GB2020/051948, filed Aug. 14, 2020, which claims priority to United Kingdom Patent Application No. 1911636.7, filed Aug. 14, 2019, and the contents of which is incorporated by reference.

REFERENCE TO A "SEQUENCE LISTING," A TABLE, OR A COMPUTER PROGRAM LISTING APPENDIX SUBMITTED ON A COMPACT DISK

This application contains a Sequence Listing submitted electronically and is hereby incorporated by reference in its entirety. The Sequence Listing ASCII text file is entitled Sequence_Listing_095095-000900US-1302238.txt is 25,713 bytes in size and was created on Feb. 7, 2022.

The present invention relates to modified *Mycobacterium* cells, and their uses as vaccines, and, particularly, although not exclusively to modified *Bacillus Calmette-Guérin* vaccines. The invention extends to the use of the modified vaccines for vaccination applications in a wide range of animals, including cattle and humans. The invention extends to novel antigens, kits and compositions comprising these novel antigens and to their use in diagnosis. The invention also relates to apparatus comprising the modified vaccine and the antigens, and/or compositions comprising the antigens.

*Mycobacterium tuberculosis* is a species of pathogenic bacteria in the family Mycobacteriaceae and the causative agent of tuberculosis in humans. Bovine tuberculosis (BTB) is caused by *Mycobacterium bovis* and remains a major problem in both the developed and developing countries. Indeed, BTB is a pressing animal health problem and is one of the biggest challenges facing the cattle farming industry today. It has been estimated that >50 million cattle are infected worldwide, costing an estimated US$3 billion annually[52].

Control of BTB in the UK is carried out by test and slaughter of infected animals, with case-finding in cattle being based primarily on the purified protein derivative (PPD) tuberculin skin test. *Bacillus Calmette-Guérin* (BCG) vaccine is an effective vaccine which is used against tuberculosis in humans, and is an attenuated strain of the *M. bovis* pathogen. Despite the unpredictable and widely diverging efficacies of vaccination with *M. bovis* BCG in cattle and humans[53-55], however, it is still the only realistic vaccine candidate with potential benefits in reducing prevalence and spread of bovine TB in the cattle population. Vaccination with BCG could also reduce the severity of a herd breakdown[20,22]. However, vaccination with BCG, is not used to control bovine tuberculosis in cattle at present, due to its variable efficacy and to its interference and cross-reaction with the tuberculin PPD skin test. Thus, in countries where test and slaughter control strategies are in operation, differential diagnostic tests will be required to Differentiate Infected from Vaccinated Animals (DIVA) to allow vaccination to be used alongside test and slaughter control practices. In order to control the spread of tuberculosis, therefore, effective vaccination and accurate early diagnosis of the disease are critical. Development of new and improved cattle vaccines, and associated diagnostic reagents, would contribute to improved disease control.

BCG is also not used in some counties, such as the USA, to protect against human tuberculosis, because it interferes with the tuberculin PPD skin test. Again, for widespread application against human TB, DIVA tests will be needed to differentiate vaccination from disease.

The present invention is seeking to address one or more problems inherent in the prior art.

The inventors set out to generate a synergistic vaccine and diagnostic approach that would permit the vaccination of cattle without interfering with the conventional PPD-based surveillance. Their approach was to widen the pool of *M. bovis* antigens that could be used as DIVA targets, by identifying antigenic proteins that could be deleted from BCG without affecting the persistence and protective efficacy of the vaccine. The inventors therefore first identified a number of BCG genes non-essential for persistence in bovine lymph nodes by transposon mutagenesis. They then inactivated these genes in BCG Danish to create a diagnostic-compatible triple knock-out (ΔBCG TK) strain. The protective efficacy of the ΔBCG TK was tested in guinea pigs experimentally infected with *M. bovis* by aerosol and found to be equivalent to wild-type BCG.

In tandem with this novel ΔBCG TK vaccine, a complementary diagnostic skin test was also developed with the antigenic proteins encoded by the genes that were deleted in the vaccine, and which did not cross-react in vaccinated or in uninfected guinea pigs but did react with *M. bovis*-challenged guinea pigs. The diagnostic skin test was also shown to show similar responses to the standard (SIT) PPD skin test and was more sensitive that the state-of-the-art synthetic DIVA skin test. Thus, the inventors have demonstrated the functionality of a new and improved BCG strain which retains its protective efficacy for use as a vaccine, but is diagnostically compatible with a novel DIVA skin test that could be implemented in control programmes. The inventors believe that although their work was carried out in BCG, which is an attenuated form of *Mycobacterium bovis*, which causes bovine tuberculosis (BTB), exactly the same principles will equally apply in *Mycobacterium tuberculosis*, which is the causative agent of tuberculosis in human, and therefore in Mycobacteriaceae more generally.

Accordingly, in a first aspect of the invention, there is provided a mutant *Mycobacterium* cell, which has been modified compared to a corresponding wild-type cell, such that a gene, or a product thereof, has been functionally deleted and/or inhibited, wherein the gene encodes an antigen selected from a group consisting of: esx-1 secretion-associated protein espC (espC); esat-6 like protein esxs (esxS); major secreted immunogenic protein Mpb70 (MPB70); cell surface lipoprotein Mpb83 (MPB83); and esx-1 secretion-associated protein espA (espA) or a homologue, paralogue, orthologue, functional fragment or variant thereof.

Advantageously, the inventors have demonstrated in the Examples that the mutant cell of the invention has the same protective efficacy in guinea pigs experimentally infected with *M. bovis* as its corresponding wild-type. Furthermore, use of the mutant cell to vaccinate a subject (for example, a herd of cattle etc.) enables the diagnosis of infected animals in the vaccinated herd. This is because detection, in a subject, of any of the antigens, espC; esxS; MPB70; MPB83; and espA, would indicate infection with *Mycobacterium* spp., such as *Mycobacterium tuberculosis* or *Mycobacterium bovis*.

Thus in one embodiment, the mutant cell is selected from a group consisting of *Mycobacterium tuberculosis, Mycobacterium bovis Bacillus Calmette Guerin* (BCG), *Mycobacterium microtti, Mycobacterium africanum, Mycobacterium smegmatis, Mycobacterium avium, Mycobacterium caprae* and *Mycobacterium vaccae*.

In one embodiment, the mutant cell is a *Mycobacterium tuberculosis* cell. *Mycobacterium tuberculosis* is known to be the causative agent of TB in man.

In a preferred embodiment, however, the mutant cell is a *Mycobacterium bovis* cell. *Mycobacterium bovis* is the causative agent of TB in cows, elephants, badgers, deer, sheep, and goats, all of which are prone to herd culling if infection is detected Preferably, the mutant cell is a *Bacillus Calmette-Guérin* (BCG) *Mycobacterium bovis* cell, i.e. one which has undergone the BCG treatment to create the BCG vaccine. It will be appreciated that the antigens, ESAT-6 and CFP-10, are absent from BCG.

Thus, preferably there is provided a mutant *Bacillus Calmette-Guérin* (BCG) *Mycobacterium bovis* cell which has been modified compared to a corresponding wild-type cell, such that a gene, or a product thereof, has been functionally deleted and/or inhibited, wherein the gene encodes an antigen selected from a group consisting of: espC; esxS; MPB70; MPB83; and espA or a homologue, paralogue, orthologue, functional fragment or variant thereof.

In a preferred embodiment, the gene, or product thereof that has been functionally deleted and/or inhibited, encodes the antigen MPB83. In a more preferred embodiment, the gene, or product thereof that has been functionally deleted and/or inhibited, encodes the antigen MPB70. In an even more preferred embodiment, the gene, or product thereof, that has been functionally deleted and/or inhibited, encodes the antigen esxS. In a most preferred embodiment, the gene, or product thereof, that has been functionally deleted and/or inhibited, encodes the antigen espC.

Preferably, the mutant cell been modified compared to a corresponding wild-type cell, such that a plurality of genes, or products thereof, have been functionally deleted and/or inhibited, wherein the plurality of genes encode at least two antigens selected from a group consisting of: espC; esxS; MPB70; MPB83; and espA.

Preferably, the mutant cell been modified compared to a corresponding wild-type cell, such that a plurality of genes, or products thereof, have been functionally deleted and/or inhibited, wherein the genes encode at least three antigens selected from a group consisting of: espC; esxS; MPB70; MPB83; and espA.

Preferably, the mutant cell been modified compared to a corresponding wild-type cell, such that a plurality of genes, or products thereof, have been functionally deleted and/or inhibited, wherein the genes encode at least four antigens selected from a group consisting of: espC; esxS; MPB70; MPB83; and espA.

Preferably, the mutant cell has been modified compared to a corresponding wild-type cell, such that a plurality of genes, or products thereof, have been functionally deleted and/or inhibited, wherein the genes encode espC; esxS; MPB70 and MPB83.

Preferably, the mutant cell has been modified compared to a corresponding wild-type cell, such that a plurality of genes, or products thereof, have been functionally deleted and/or inhibited, wherein the genes encode esxS, espC; Mb3046c; MPB70; MPB83; and espA.

In one embodiment, the mutant cell has been modified compared to a corresponding wild-type cell, such that a gene, or product thereof, has been functionally deleted and/or inhibited, wherein the gene encodes esxS, or a homologue, paralogue, orthologue, functional fragment or variant thereof. esxS (from *M. bovis*) is provided by GeneBank locus ID 32287927. The protein sequence may be represented by the GeneBank ID, which is provided herein as SEQ ID No: 1, as follows:

[SEQ ID No: 1]
MSLLDAHIPQLIASHTAFAAKAGLMRHTIGQAEQQAMSAQAFHQGESAAA

FQGAHARFVAAAAKVNTLLDIAQANLGEAAGTYVAADAAAASSYTGF

Accordingly, preferably esxS comprises or consists of an amino acid sequence substantially as set out in SEQ ID NO: 1, or a functional fragment or variant thereof.

In one embodiment, esxS (from *M. bovis*) is encoded by a nucleotide sequence which is provided herein as SEQ ID No: 2, as follows:

[SEQ ID No: 2]
ATGAGTTTGTTGGATGCCCATATTCCGCAGTTGATCGCTTCGCATACGGC

GTTTGCCGCTAAGGCGGGGTTGATGCGGCATACGATCGGTCAGGCCGAGC

AGCAGGCGATGTCGGCGCAGGCGTTTCATCAGGGAGAGTCCGCGGCGGCG

TTTCAGGGTGCGCATGCCCGGTTTGTGGCCGCGGCCGCCAAGGTCAATAC

CTTGCTGGATATCGCGCAAGCCAATTTGGGTGAGGCCGCGGGCACGTATG

TGGCCGCCGATGCCGCCGCCGCGTCCAGCTACACCGGGTTTTAA

Accordingly, preferably esxS comprises or consists of a nucleotide sequence substantially as set out in SEQ ID NO: 2, or a fragment or variant thereof.

In one embodiment, the mutant cell has been modified compared to a corresponding wild-type cell, such that a gene, or product thereof, has been functionally deleted and/or inhibited, wherein the gene encodes MPB70, or a homologue, paralogue, orthologue, functional fragment or variant thereof. MPB70 (from *M. bovis*) is provided by GeneBank locus ID 3228783. The protein sequence may be represented by the GeneBank ID, which is provided herein as SEQ ID No: 3, as follows:

[SEQ ID No: 3]
MKVKNTIAATSFAAAGLAALAVAVSPPAAAGDLVGPGCAEYAAANPTGPA

SVQGMSQDPVAVAASNNPELTTLTAALSGQLNPQVNLVDTLNSGQYTVFA

PTNAAFSKLPASTIDELKTNSSLLTSILTYHVVAGQTSPANVVGTRQTLQ

GASVTVTGQGNSLKVGNADWCGGVSTANATVYMIDSVLMPPA

Accordingly, preferably MPB70 comprises or consists of an amino acid sequence substantially as set out in SEQ ID NO: 3, or a functional fragment or variant thereof.

In one embodiment, MPB70 (from *M. bovis*) is encoded by a nucleotide sequence which is provided herein as SEQ ID No: 4, as follows:

[SEQ ID No: 4]
ATGAAGGTAAAGAACACAATTGCGGCAACCAGTTTCGCGGCGGCCGGCCT

GGCGGCTCTGGCGGTGGCTGTCTCACCGCCGGCGGCCGCAGGCGATCTGG

TGGGCCCGGGCTGCGCGGAATACGCGGCAGCCAATCCCACTGGGCCGGCC

TCGGTGCAGGGAATGTCGCAGGACCCGGTCGCGGTGGCGGCCTCGAACAA

TCCGGAGTTGACAACGCTGACGGCTGCACTGTCGGGCCAGCTCAATCCGC

AAGTAAACCTGGTGGACACCCTCAACAGCGGTCAGTACACGGTGTTCGCA

-continued
```
CCGACCAACGCGGCATTTAGCAAGCTGCCGGCATCCACGATCGACGAGCT

CAAGACCAATTCGTCACTGCTGACCAGCATCCTGACCTACCACGTAGTGG

CCGGCCAAACCAGCCCGGCCAACGTCGTCGGCACCCGTCAGACCCTCCAG

GGCGCCAGCGTGACGGTGACCGGTCAGGGTAACAGCCTCAAGGTCGGTAA

CGCCGACGTCGTCTGTGGTGGGGTGTCTACCGCCAACGCGACGGTGTACA

TGATTGACAGCGTGCTAATGCCTCCGGCGTAA
```

Accordingly, preferably MPB70 comprises or consists of a nucleotide sequence substantially as set out in SEQ ID NO: 4, or a fragment or variant thereof.

In one embodiment, the mutant cell has been modified compared to a corresponding wild-type cell, such that a gene, or product thereof, has been functionally deleted and/or inhibited, wherein the gene encodes MPT83, or a homologue, paralogue, orthologue, functional fragment or variant thereof. MPT83 (from *M. bovis*) is provided by GeneBank locus ID 32288940. The protein sequence may be represented by the GeneBank ID, which is provided herein as SEQ ID No: 5, as follows:

```
                                        [SEQ ID No: 5]
MINVQAKPAAAASLAAIAIAFLAGCSSTKPVSQDTSPKPATSPAAPVTTA

AMADPAADLIGRGCAQYAAQNPTGPGSVAGMAQDPVATAASNNPMLSTLT

SALSGKLNPDVNLVDTLNGGEYTVFAPTNAAFDKLPAATIDQLKTDAKLL

SSILTYHVIAGQASPSRIDGTHQTLQGADLTVIGARDDLMVNNAGLVCGG

VHTANATVYMIDTVLMPPAQ
```

Accordingly, preferably MPB83 comprises or consists of an amino acid sequence substantially as set out in SEQ ID NO: 5, or a functional fragment or variant thereof.

In one embodiment, MPB83 (from *M. bovis*) is encoded by a nucleotide sequence which is provided herein as SEQ ID No: 6, as follows:

```
                                        [SEQ ID No: 6]
ATGATCAACGTTCAGGCCAAACCGGCCGCAGCAGCGAGCCTCGCAGCCA

TCGCGATTGCGTTCTTAGCGGGTTGTTCGAGCACCAAACCCGTGTCGCA

AGACACCAGCCCGAAACCGGCGACCAGCCCGGCGGCGCCCGTTACCACG

GCGGCAATGGCTGACCCCGCAGCGGACCTGATTGGTCGTGGGTGCGCGC

AATACGCGGCGCAAAATCCCACCGGTCCCGGATCGGTGGCCGGAATGGC

GCAAGACCCGGTCGCTACCGCGGCTTCCAACAACCCGATGCTCAGTACC

CTGACCTCGGCTCTGTCGGGCAAGCTGAACCCGGATGTGAATCTGGTCG

ACACCCTCAACGGCGGCGAGTACACCGTTTTCGCCCCCACCAACGCCGC

ATTCGACAAGCTGCCGGCGGCCACTATCGATCAACTCAAGACTGACGCC

AAGCTGCTCAGCAGCATCCTGACCTACCACGTGATAGCCGGCCAGGCGA

GTCCGAGCAGGATCGACGGCACCCATCAGACCCTGCAAGGTGCCGACCT

GACGGTGATAGGCGCCCGCGACGACCTCATGGTCAACAACGCCGGTTTG

GTATGTGGCGGAGTTCACACCGCCAACGCGACGGTGTACATGATCGATA

CGGTGCTGATGCCCCCGGCACAGTAA
```

Accordingly, preferably MPB83 comprises or consists of a nucleotide sequence substantially as set out in SEQ ID NO: 4, or a fragment or variant thereof.

In one embodiment, the mutant cell has been modified compared to a corresponding wild-type cell, such that a gene, or product thereof, has been functionally deleted and/or inhibited, wherein the gene encodes espC, or a homologue, paralogue, orthologue, functional fragment or variant thereof. espC (from *M. bovis*) is provided by GeneBank locus ID 32287904. The protein sequence may be represented by the GeneBank ID, which is provided herein as SEQ ID No: 7, as follows:

```
                                        [SEQ ID No: 7]
MTENLTVQPERLGVLASHHDNAAVDASSGVEAAAGLGESVAITHGPYCS

QFNDTLNVYLTAHNALGSSLHTAGVDLAKSLRIAAKIYSEADEAWRKAI

DGLFT
```

Accordingly, preferably espC comprises or consists of an amino acid sequence substantially as set out in SEQ ID NO: 7, or a functional fragment or variant thereof.

In one embodiment, espC (from *M. bovis*) is encoded by a nucleotide sequence which is provided herein as SEQ ID No: 8, as follows:

```
                                        [SEQ ID No: 8]
ATGACGGAAAACTTGACCGTCCAGCCCGAGCGTCTCGGTGTACTGGCGT

CGCACCATGACAACGCGGCGGTCGATGCCTCCTCGGGCGTCGAAGCTGC

CGCTGGCCTAGGCGAATCTGTGGCGATCACTCACGGTCCGTACTGCTCA

CAGTTCAACGACACGTTAAATGTGTACTTGACTGCCCACAATGCCCTGG

GCTCGTCCTTGCATACGGCCGGTGTCGATCTCGCCAAAAGTCTTCGAAT

TGCGGCGAAGATATATAGCGAGGCCGACGAAGCGTGGCGCAAGGCTATC

GACGGGTTGTTTACCTGA
```

Accordingly, preferably espC comprises or consists of a nucleotide sequence substantially as set out in SEQ ID NO: 8, or a fragment or variant thereof.

In one embodiment, the mutant cell has been modified compared to a corresponding wild-type cell, such that a gene, or product thereof, has been functionally deleted and/or inhibited, wherein the gene encodes espA, or a homologue, paralogue, orthologue, functional fragment or variant thereof. espA (from *M. bovis*) is provided by GeneBank locus ID 32287903. The protein sequence may be represented by the GeneBank ID, which is provided herein as SEQ ID No: 9, as follows:

```
                                        [SEQ ID No: 9]
MSRAFIIDPTISAIDGLYDLLGIGIPNQGGILYSSLEYFEKALEELAA

AFPGDGWLGSAADKYAGKNRNHVNFFQELADLDRQLISLIHDQANAVQ

TTRDILEGAKKGLEFVRPVAVDLTYIPVVGHALSAAFQAPFCAGAMAV

VGGALAYLAVKTLINATQLLKLLAKLAELVAAAIADIISDVADIIKGI

LGEVWEFITNALNGLKELWDKLTGWVTGLFSRGWSNLESFFAGVPGLT

GATSGLSQVTGLFGAAGLSASSGLAHADSLASSASLPALAGIGGGSGF

GGLPSLAQVHAASTRQALRPRADGPVGAAAEQVGGQSQLVSAQGSQGM

GGPVGMGGMHPSSGASKGTTTKKYSEGAAAGTEDAERAPVEADAGGGQ

KVLVRNVV
```

Accordingly, preferably espA comprises or consists of an amino acid sequence substantially as set out in SEQ ID NO: 9, or a functional fragment or variant thereof.

In one embodiment, espA (from *M. bovis*) is encoded by a nucleotide sequence which is provided herein as SEQ ID No: 10, as follows:

[SEQ ID No: 10]
ATGAGCAGAGCGTTCATCATCGATCCAACGATCAGTGCCATTGACGG
CTTGTACGACCTTCTGGGGATTGGAATACCCAACCAAGGGGTATCC
TTTACTCCTCACTAGAGTACTTCGAAAAAGCCCTGGAGGAGCTGGCA
GCAGCGTTTCCGGGTGATGGCTGGTTAGGTTCGGCCGCGGACAAATA
CGCCGGCAAAAACCGCAACCACGTGAATTTTTTCCAGGAACTGGCAG
ACCTCGATCGTCAGCTCATCAGCCTGATCCACGACCAGGCCAACGCG
GTCCAGACGACCCGCGACATCCTGGAGGGCGCCAAGAAAGGTCTCGA
GTTCGTGCGCCCGGTGGCTGTGGACCTGACCTACATCCCGGTCGTCG
GGCACGCCCTATCGGCCGCCTTCCAGGCGCCGTTTTGCGCGGGCGCG
ATGGCCGTAGTGGGCGGCGCGCTTGCCTACTTGGTCGTGAAAACGCT
GATCAACGCGACTCAACTCCTCAAATTGCTTGCCAAATTGGCGGAGT
TGGTCGCGGCCGCCATTGCGGACATCATTTCGGATGTGGCGGACATC
ATCAAGGGCACCCTCGGAGAAGTGTGGGAGTTCATCACAAACGCGCT
CAACGGCCTGAAAGAGCTTTGGGACAAGCTCACGGGGTGGGTGACCG
GACTGTTCTCTCGAGGGTGGTCGAACCTGGAGTCCTTCTTTGCGGGC
GTCCCCGGCTTGACCGGCGCGACCAGCGGCTTGTCGCAAGTGACTGG
CTTGTTCGGTGCGGCCGGTCTGTCCGCATCGTCGGGCTTGGCTCACG
CGGATAGCCTGGCGAGCTCAGCCAGCTTGCCCGCCCTGGCCGGCATT
GGGGGCGGGTCCGGTTTTGGGGGCTTGCCGAGCCTGGCTCAGGTCCA
TGCCGCCTCAACTCGGCAGGCGCTACGGCCCCGAGCTGATGGCCCGG
TCGGCGCCGCTGCCGAGCAGGTCGGCGGGCAGTCGCAGCTGGTCTCC
GCGCAGGGTTCCCAAGGTATGGGCGGACCCGTAGGCATGGGCGGCAT
GCACCCCTCTTCGGGGCGTCGAAAGGGACGACGACGAAGAAGTACT
CGGAAGGCGCGGCGGCGGGCACTGAAGACGCCGAGCGCGCGCCAGTC
GAAGCTGACGCGGGCGGTGGGCAAAAGGTGCTGGTACGAAACGTCGT
CTAA

Accordingly, preferably espA comprises or consists of a nucleotide sequence substantially as set out in SEQ ID NO: 10, or a fragment or variant thereof.

The mutant cell is modified by functional deletion and/or inhibition of the gene, or a product thereof (i.e. when the gene product thereof is inhibited). The gene, or product thereof, may be functionally deleted and/or inhibited by:
(i) shifting the reading frame of the coding sequence of the gene;
(ii) adding, substituting or deleting amino acids in the protein encoded by the gene;
(iii) partially or entirely deleting the DNA coding for the gene and/or the upstream and downstream regulatory sequences associated with the gene; or
(iv) gene-silencing molecules that interfere with the expression of the gene.

Such techniques are routine in the art, and would be known to the skilled person.

The modification may be to cause a mutation, which disrupts the expression or function of the gene product, i.e. the antigen. Such mutations may be to the nucleic acid sequences that act as 5' or 3' regulatory sequences for the gene or may preferably be a mutation introduced into the coding sequence of the gene. Functional deletion of the gene may, for example, be by mutation of the gene in the form of nucleotide substitution, addition or, preferably, nucleotide deletion.

A preferred means of introducing a mutation into a bacterial gene is to utilize molecular biology techniques specifically to target the gene which is to be mutated. Mutations may be induced using a DNA molecule. A most preferred means of introducing a mutation is to use a DNA molecule that has been specially prepared such that homologous recombination occurs between the target gene and the DNA molecule. When this is the case, the DNA molecule will ideally contain base sequences complementary to the target chromosomal location to allow the DNA molecule to hybridize to (and subsequently recombine with) the target. CRISPR may be used to create the mutant cell by functionally deleting the or each gene encoding the antigen(s).

Preferably, the mutant cell is modified by functionally deleting the or each gene from the genome of the corresponding wild-type cell. For example, the mutant cell is modified by deletion or removal of the nucleic acid encoding the or each antigen, or a fragment thereof which renders the expressed antigen non-functional or which prevents or reduces expression. The deletion may be achieved using a transduction method comprising use of an antibiotic cassette for the selection of the mutant. For example, the method may comprise sequential deletion steps each using a vector with a different antibiotic cassette for the selection of mutants where more than one antigen is deleted.

The term "gene-silencing molecule" can mean any molecule that interferes with the expression of the gene(s) to prevent or reduce gene expression. Such molecules include, but are not limited to, RNAi molecules, including siNA, siRNA, shRNA, miRNA, ribozymes and antisense molecules. Such molecules may be expressed from a genomically integrated sequence in the mutant cell.

Gene-silencing molecules may be antisense molecules (antisense DNA or antisense RNA) or ribozyme molecules. Ribozymes and antisense molecules may be used to inhibit the transcription of the gene(s). Antisense molecules are oligonucleotides that bind in a sequence-specific manner to nucleic acids, such as DNA or RNA. When bound to mRNA that has a complimentary sequence, antisense RNA prevents translation of the mRNA. Triplex molecules refer to single antisense DNA strands that bind duplex DNA forming a colinear triplex molecule, thereby preventing transcription. Particularly useful antisense nucleotides and triplex molecules are ones that are complimentary to, or bind, the sense strand of DNA (or mRNA) that encodes the gene product.

The expression of ribozymes, which are enzymatic RNA molecules capable of catalysing the specific cleavage of RNA substrates, may also be used to block protein translation. The mechanism of ribozyme action involves sequence specific hybridisation of the ribozyme molecule to complementary target RNA, followed by endonucleolytic cleavage, e.g. hammerhead motif ribozymes.

Preferably, the term functional fragment or variant thereof in relation to amino acid sequences, relates to a fragment or variant that is capable of inducing an immune response when introduced into a subject, such that the fragment or variant retains its antigenic properties. It will be appreciated that the DNA and protein sequences of the antigens: espC; esxS; MPB70; MPB83; and espA, may differ between *Mycobacterium* spp., and especially *Mycobacterium tuber-* culosis or *Mycobacterium bovis*. However, the skilled person will know that variants of these antigens include homologues, orthologues and paralogues between the species.

For example, MPB70 is the immunogenic protein encoded by the gene BCG2897 from BCG, and the Mb2900 gene from *M. bovis*, whereas MPT70 is the corresponding protein encoded by the Rv2875 gene from *M. tuberculosis*.

For example, MPB83 is the immunogenic protein encoded by the BCG2895 gene in BCG, and the Mb2898 gene from *M. bovis*, whereas MPT83 is the corresponding protein encoded by the Rv2873 gene from *M. tuberculosis*.

For example, esx-1 secretion-associated protein EspC (espC) is the immunogenic protein encoded by the gene BCG3679 from BCG, and the Mb3645c gene from *M. bovis*, whereas EspC is the corresponding protein encoded by the Rv3615c gene from *M. tuberculosis*.

For example, esat-6 like protein esxs (esxS) is the immunogenic protein encoded by the BCG3043 gene from BCG, and the Mb3046c gene from *M. bovis*, whereas esxs is the corresponding protein encoded by the Rv3020c gene from *M. tuberculosis*.

For example, esx-1 secretion-associated protein EspA, (espA) is the immunogenic protein encoded by the BCG3680 gene from BCG, and the Mb3646c gene from *M. bovis*, whereas the corresponding protein encoded by the Rv3616c gene from *M. tuberculosis*.

The mutant cell, preferably a BCG strain, may be inactivated or attenuated. Preferably, the mutant cell or BCG strain is attenuated.

The mutant cell may be further modified to increase its immunogenicity in a host. For example, the expression of immunogenic domains of bacteria, viruses and parasites have been used successfully in BCG, for example, generating recombinant strains, which display increased immunogenicity in a host.

Thus, in another embodiment, the mutant cell may express a protein that increases its immunogenicity in a host.

Preferably, the protein comprises or is an immunogenic domain derived from a bacterium, virus or parasite.

Adjuvant properties have been attributed to several bacterial toxins. For example, it is widely known that the tetanus (TT), diphtheria (DT) and cholera (CT) toxins as well as the *Escherichia coli* (*E. coli*) heat-labile toxin (LT) act as adjuvants that direct the immune response to Th2 when coadministered with other antigens [Ryan, E. J. et al. (2000) Modulation of innate and acquired immune responses by *Escherichia coli* heat-labile toxin: distinct pro and anti-inflammatory effects of the nontoxic AB complex and the enzyme activity. J Immunol. 165:5750-5759; Miyaji, E. N. et al. (2001) Induction of neutralizing antibodies against diphtheria toxin by priming with recombinant *Mycobacterium bovis* BCG expressing CRM197, a mutant diphtheria toxin. Infect Immun. 69:869-874].

Thus, preferably the immunogenic domain is derived from a bacterium.

In another embodiment, the mutant cell may express a bacterial heat-labile toxin (LT). Preferably, the toxin is a tetanus, diphtheria, cholera or *Escherichia coli* heat-labile toxin.

Preferably, the toxin is modified to render it non-toxic in a host. Such toxins and modifications are well-known in the art.

The *E. coli* LT toxin is among the most potent adjuvants described so far [Lycke, N. et al. (199 The adjuvant effect of *Vibrio cholerae* and *Escherichia coli* heat-labile enterotoxins is linked to their ADP-ribosyltransferase activity. Eur J Immunol. 22:2277-2281; Pizza, M. et al. (2001) Mucosal vaccines: nontoxic derivatives of LT and CT as mucosal adjuvants. Vaccine, 19:2534-2541].

US20150152145A1, now U.S. Pat. No. 9,512,186, describes a mutant *Escherichia coli* heat-labile toxin effective for use in the *Mycobacterium* cell of the invention.

Thus, in another embodiment, the mutant cell may express a mutant *Escherichia coli* heat-labile toxin, or a mutant A subunit thereof.

In an embodiment, the *Escherichia coli* heat-labile toxin A subunit may comprise a 5; signal peptide, and may be provided herein as SEQ ID No: 40, as follows

[SEQ ID NO: 40]
MKNITFIFFILLASPLYANGDRLYRADSRPPDEIKRSGGLMPRGHNEYF

DRGTQMNINLYDHARGTQTGFVRYDDGYVSTSLSLRSAHLAGQSILSGY

STYYIYVIATAPNMFNVNDVLGVYSPHPYEQEVSALGGIPYSQIYGWYR

VNFGVIDERLHRNREYRDRYYRNLNIAPAEDGYRLAGFPPDHQAWREEP

WIHHAPQGCGNSSRTITGDTCNEETQNLSTIYLREYQSKVKRQIFSDYQ

SEVDIYNRIRDEL

Accordingly, preferably the *Escherichia coli* heat-labile toxin subunit A comprises or consists of an amino acid sequence substantially as set out in SEQ ID NO: 40, or a functional fragment or variant thereof.

Preferably, the *Escherichia coli* heat-labile toxin subunit A is mutated at position 81 of SEQ ID NO: 40.

Preferably, the mutation is a substitution of serine for lysine.

Thus, preferably, in an embodiment, the *Escherichia coli* heat-labile toxin A subunit may be provided herein as SEQ ID No: 15, as follows:

[SEQ ID NO: 15]
NGDRLYRADSRPPDEIKRSGGLMPRGHNEYFDRGTQMNINLYDHARGTQ

TGFVRYDDGYVSTSLSLRSAHLAGQSILSGYSTYYIYVIATAPNMFNVN

DVLGVYSPHPYEQEVSALGGIPYSQIYGWYRVNFGVIDERLHRNREYRD

RYYRNLNIAPAEDGYRLAGFPPDHQAWREEPWIHHAPQGCGNSSRTITG

DTCNEETQNLSTIYLREYQSKVKRQIFSDYQSEVDIYNRIRDEL

Accordingly, preferably the *Escherichia coli* heat-labile toxin A subunit comprises or consists of an amino acid sequence substantially as set out in SEQ ID NO: 15, or a functional fragment or variant thereof.

Preferably, the *Escherichia coli* heat-labile toxin A subunit is mutated at position 63 of SEQ ID NO: 15.

Preferably, the mutation is a substitution of serine for lysine.

Advantageously, vaccination with the mutant *Mycobacterium* cell provides the opportunity of adding additional antigens, deleted from the *Mycobacterium* genome, to the current DIVA cocktail that provides an enhanced sensitivity skin test reagent capable of detecting BTB infection in mutant *Mycobacterium*-inoculated subjects.

Thus, in a second aspect of the invention, there is provided the mutant *Mycobacterium* cell according to the first aspect, for use as a medicament.

Preferably, the mutant cell comprises *Bacillus Calmette-Guérin* (BCG).

In a third aspect of the invention, there is provided the mutant *Mycobacterium* cell according to the first aspect, for use in preventing tuberculosis.

Preferably, the mutant cell comprises *Bacillus Calmette-Guérin* (BCG).

Preferably, the mutant *Mycobacterium* cell prevents tuberculosis caused by *Mycobacterium bovis* or *Mycobacterium tuberculosis* infection. Most preferably, the mutant cell prevents tuberculosis caused by a *Mycobacterium bovis* infection.

Preferably, the mutant cell according to the first aspect is for use in preventing tuberculosis in a mammal. Preferably, the mammal is selected from a group consisting of: human; cow; elephant; badger; deer; camelids; sheep; and goat.

Preferably, the mammal is a human. Most preferably, the mammal is a cow. Thus, preferably the tuberculosis to be prevented is bovine tuberculosis (BTB).

In a fourth aspect of the invention, there is provided a vaccine comprising the mutant cell according to the first aspect.

In a fifth aspect of the invention, there is provided the mutant cell according to the first aspect, or the vaccine of the fourth aspect, for use in stimulating an immune response in a subject.

The subject may be a mammal. Preferably, the mammal is selected from the group consisting of: human; cow; elephant; badger; camelids; deer; sheep; and goat. Preferably, the mammal is a human. Most preferably, the mammal is a cow.

Preferably, the immune response is stimulated against antigens of *Mycobacterium bovis* or *Mycobacterium tuberculosis*. Most preferably, the immune response is stimulated against antigens of *Mycobacterium bovis*.

In a sixth aspect of the invention, there is provided a method of preventing tuberculosis, the method comprising administering, or having administered, to a subject in need thereof, a therapeutically effective amount of the mutant cell of the first aspect, or the vaccine of the fourth aspect.

It will be appreciated the use of the fifth aspect and the method of the sixth aspect relate to a method of vaccination against TB.

The inventors have also developed a diagnostic test that utilises specific antigens that can be used in conjunction with the mutant cell of the first aspect, or the vaccine of the fourth aspect, that is capable of detecting a tuberculosis infection without the risk of producing significant false positive results.

Accordingly, in a seventh aspect of the invention, there is provided at least two antigens selected from the group consisting of espC; esxS; MPB70; MPB83; or a functional variant or fragment thereof, for use in diagnosis.

Preferably, the use comprises least three antigens selected from the group consisting of: espC; esxS; MPB70; and MPB83, or at least four antigens selected from the group consisting of: espC; esxS; MPB70 and MPB83.

Preferably, there is provided at least two antigens selected from the group consisting of espC; esxS; MPB70; MPB83, ESAT6 and CFP-10.

Preferably, the use comprises at least three antigens selected from the group consisting of: espC; esxS; MPB70; MPB83; ESAT6 and CFP-10, at least four antigens selected from the group consisting of: espC; esxS; MPB70; MPB83; ESAT6 and CFP-10, or at least five antigens selected from the group consisting of: espC; esxS; MPB70; MPB83; ESAT6 and CFP-10.

In a preferred embodiment, there is provided the antigens: espC; esxS; MPB70 and MPB83, for use in diagnosis.

In a preferred embodiment, there is provided the antigens: espC; esxS; MPB70; MPB83; ESAT6; and CFP1, for use in diagnosis.

Preferably, MPB70; MPB83; espC and esxS are as defined in the first aspect.

In one embodiment, ESAT6 is provided by GeneBank locus ID NC_000962.3. The protein sequence may be represented by the GeneBank ID, which is provided herein as SEQ ID No: 11, as follows:

```
                                          [SEQ ID No: 11]
MTEQQWNFAGIEAAASAIQGNVTSIHSLLDEGKQSLTKLAAAWGGSGSE

AYQGVQQKWDATATELNNALQNLARTISEAGQAMASTEGNVTGMFA
```

Accordingly, preferably ESAT6 comprises or consists of an amino acid sequence substantially as set out in SEQ ID NO: 11, or a functional fragment or variant thereof.

In one embodiment, ESAT6 is encoded by a nucleotide sequence which is provided herein as SEQ ID No: 12, as follows:

```
                                          [SEQ ID No: 12]
ATGACAGAGCAGCAGTGGAATTTCGCGGGTATCGAGGCCGCGGCAAGCG

CAATCCAGGGAAATGTCACGTCCATTCATTCCCTCCTTGACGAGGGGAA

GCAGTCCCTGACCAAGCTCGCAGCGGCCTGGGGCGGTAGCGGTTCGGAG

GCGTACCAGGGTGTCCAGCAAAAATGGGACGCCACGGCTACCGAGCTGA

ACAACGCGCTGCAGAACCTGGCGCGGACGATCAGCGAAGCCGGTCAGGC

AATGGCTTCGACCGAAGGCAACGTCACTGGGATGTTCGCATAG
```

Accordingly, preferably ESAT6 comprises or consists of a nucleotide sequence substantially as set out in SEQ ID NO: 12, or a fragment or variant thereof.

In one embodiment, CFP10 is provided by GeneBank locus ID NC_002945.4. The protein sequence may be represented by the GeneBank ID, which is provided herein as SEQ ID No: 13, as follows:

```
                                          [SEQ ID No: 13]
MAEMKTDAATLAQEAGNFERISGDLKTQIDQVESTAGSLQGQWRGAAGT

AAQAAVVRFQEAANKQKQELDEISTNIRQAGVQYSRADEEQQQALSSQM

GF
```

Accordingly, preferably CFP10 comprises or consists of an amino acid sequence substantially as set out in SEQ ID NO: 13, or a functional fragment or variant thereof.

In one embodiment, CFP10 is encoded by a nucleotide sequence which is provided herein as SEQ ID No: 14, as follows:

```
                                          [SEQ ID No: 14]
ATGGCAGAGATGAAGACCGATGCCGCTACCCTCGCGCAGGAGGCAGGTA

ATTTCGAGCGGATCTCCGGCGACCTGAAAACCCAGATCGACCAGGTGGA

GTCGACGGCAGGTTCGTTGCAGGGCCAGTGGCGCGGCGCGGCGGGGACG

GCCGCCCAGGCCGCGGTGGTGCGCTTCCAAGAAGCAGCCAATAAGCAGA

AGCAGGAACTCGACGAGATCTCGACGAATATTCGTCAGGCCGGCGTCCA

ATACTCGAGGGCCGACGAGGAGCAGCAGCAGGCGCTGTCCTCGCAAATG

GGCTTCTGA
```

Accordingly, preferably CFP10 comprises or consists of a nucleotide sequence substantially as set out in SEQ ID NO: 14, or a fragment or variant thereof.

In one embodiment, the antigens are present as fusion proteins. The fusion proteins may comprises a fusion of two or more of the antigens selected from a group consisting of: espC; esxS; MPB70; MPB83; ESAT6; and CFP1.

In one embodiment, the fusion protein may comprise a linker sequence between each antigen. In one embodiment, the fusion proteins do not comprise a linker sequence between each antigen.

In one embodiment, ESAT6 and CFP10 are present as fusion proteins. In one embodiment, ESAT6 and MPB70 are present as fusion proteins. In one embodiment, ESAT6 and MPB83 are present as fusion proteins. In one embodiment, ESAT6 and espC are present as fusion proteins. In one embodiment, ESAT6 and esxS are present as fusion proteins.

In one embodiment, CFP10 and MPB70 are present as fusion proteins. In one embodiment, CFP10 and MPB83 are present as fusion proteins. In one embodiment, CFP10 and espC are present as fusion proteins. In one embodiment, CFP10 and esxS are present as fusion proteins.

In one embodiment, MPB70 and MPB83 are present as fusion proteins.

In one embodiment, MPB70 and espC are present as fusion proteins. In one embodiment, MPB70 and esxS are present as fusion proteins.

In one embodiment, MPB83 and espC are present as fusion proteins. In one embodiment, MPB83 and esxS are present as fusion proteins.

In one embodiment, espC and esxS are present as fusion proteins.

Preferably, the use of the seventh aspect comprises the use of an espC/esxS fusion protein, a MPB70/MPB83 fusion protein and/or a ESAT6/CFP10 fusion protein, for use in diagnosis.

In another embodiment, the use of the seventh aspect comprises an espC/esxS fusion protein and a MPB70/MPB83 fusion protein, for use in diagnosis.

In another embodiment, the use of the seventh aspect comprises an espC/esxS fusion protein, a MPB70/MPB83 fusion protein and a ESAT6/CFP10 fusion protein, for use in diagnosis.

In an eighth aspect, there is provided a composition comprising or consisting of the antigens as defined in the seventh aspect.

Preferably, the composition does not comprise any other *Mycobacterium bovis* or *Mycobacterium tuberculosis* antigen.

In a ninth aspect of the invention, there is provided the composition according to the eighth aspect, for use in diagnosis.

Preferably, the use of the seventh and ninth aspects are for diagnosing tuberculosis in a subject.

Hence, in a tenth aspect of the invention, there is provided the antigens as defined in the seventh aspect, or the composition as defined in the eighth aspect, for use in diagnosing tuberculosis.

The antigens or composition may be used for diagnosis of tuberculosis caused by a *Mycobacterium* selected from a group consisting of: *Mycobacterium tuberculosis; Mycobacterium bovis; Bacillus Calmette Guerin* (BCG); *Mycobacterium microtti; Mycobacterium africanum; Mycobacterium smegmatis; Mycobacterium avium; Mycobacterium caprae* and *Mycobacterium vaccae* infection.

Preferably, the antigens or composition may be used for diagnosis of tuberculosis caused by *Mycobacterium caprae, Mycobacterium bovis* or *Mycobacterium tuberculosis* infection. More preferably, the antigens or composition may be used for diagnosis of tuberculosis caused by a *Mycobacterium bovis* or *Mycobacterium tuberculosis* infection. Most preferably, the antigens may be used for diagnosis of tuberculosis caused by a *Mycobacterium bovis* infection.

Preferably, the antigens or composition are for use in diagnosing tuberculosis in a mammal. Preferably, the mammal is selected from the group consisting of: humans; cattle; elephants; badgers; camelids; deer; sheep and goats. Preferably, the mammal is a human. Most preferably, the mammal is a cow.

Preferably, the tuberculosis is bovine tuberculosis. Preferably, the tuberculosis is human tuberculosis.

Thus, the use may further comprise detecting an immune response induced by the antigens or composition upon exposing a subject thereto. For example, the subject being tested may be exposed to the antigens or composition, and then any immune response to the antigens or composition is preferably detected.

The use may comprise the use of the antigens or composition in a tuberculin skin test.

Thus, the use may further comprise injecting the antigens or composition intra-dermally and detecting a delayed-type-hypersensitivity reaction. Detecting an immune response may comprise measuring reaction size, swelling or a lump at a site of injection of the antigens or composition, wherein the presence of such reactions is indicative of tuberculosis.

The invention also provides for a kit for diagnosing a subject suffering from tuberculosis.

Hence, according to an eleventh aspect of the invention, there is provided a tuberculosis diagnostic kit, comprising the antigens as defined in the seventh aspect, or the composition as defined in the eighth aspect.

The kit may further comprise means for detecting an immune response to the antigens as defined in the seventh aspect, or the composition as defined in the eighth aspect.

The immune response may comprise detecting an immune response. Preferably, a delayed-type hypersensitivity reaction, such as reaction size measurements, swelling or a lump at a site of injection of the antigens as defined in the seventh aspect, or the composition as defined in the eighth aspect.

Preferably, the kit is for diagnosis of tuberculosis in a mammal. Preferably, the mammal is selected from the group consisting of: humans; cattle; elephants; badgers; deer; sheep and goats. Preferably, the mammal is a human. Most preferably, the mammal is a cow. Thus, preferably, the tuberculosis to be prevented is bovine tuberculosis.

Using the modified cell of the first aspect and the antigens of the seventh aspect, the inventors have generated a synergistic vaccine and diagnostic approach that advantageously permits the vaccination of a subject without interfering with the conventional PPD-based surveillance test.

Thus, in a twelfth aspect of the invention, there is provided an apparatus for tuberculosis vaccination and diagnosis, the apparatus comprising:

(i) a vaccine comprising a mutant *Mycobacterium* cell, which has been modified compared to a corresponding wild-type cell, such that one or more gene, or a product thereof, has been functionally deleted and/or inhibited, wherein the or each gene encodes a native antigen; and
(ii) a composition configured to detect a *Mycobacterium* infection in a subject vaccinated with the vaccine of (i), the composition comprising the at least one antigen of (i).

Preferably, the mutant *Mycobacterium* cell of (i) is as defined in the first aspect and the composition of (ii) is as defined in the eighth aspect.

Thus, preferably the vaccine comprises a mutant *Mycobacterium* cell, which has been modified compared to a corresponding wild-type cell, such that one or more gene, or a product thereof, has been functionally deleted and/or inhibited, wherein the or each gene encodes a native antigen selected from a group consisting of: espC; esxS; MPB70; MPB83; and espA or a homologue, paralogue, orthologue, functional fragment or variant thereof.

Preferably, the apparatus is for vaccination and diagnosis of tuberculosis in a mammal. Preferably, the mammal is selected from the group consisting of: humans; cattle; elephants; badgers; camelids; deer; sheep and goats. Preferably, the mammal is human. Most preferably, the mammal is a cow.

Thus, preferably the tuberculosis is bovine tuberculosis or human tuberculosis.

In a thirteenth aspect of the invention, there is provided a method of treating tuberculosis, the method comprising:
(i) administering, or having administered, to a subject in need thereof, a therapeutic amount of the mutant *Mycobacterium* cell according to the first aspect, or the vaccine according to the fourth aspect;
(ii) administering, or having administered, the antigens according to the seventh aspect, or the composition according to the eighth aspect, to a subject in need thereof;
(iii) detecting an immune response to the antigens as defined in the seventh aspect, or the composition as defined in the eighth aspect, in the subject; and
(iv) treating tuberculosis in the subject.

The subject may be a mammal. Preferably, the mammal is selected from the group consisting of: humans; cattle; elephants; badgers; camelids; deer; sheep and goats.

Most preferably, the mammal is cattle. Thus, preferably, the tuberculosis to be treated is bovine tuberculosis.

Preferably, the subject is a human. Thus, preferably the tuberculosis to be treated is human tuberculosis.

The administration step (ii) may comprise injecting the antigens or composition dermally or sub-dermally, preferably sub-dermally.

Detecting an immune response of step (iii) may comprise measuring reaction size, swelling or a lump at a site of injection of the antigens or composition, wherein the presence of such reactions is indicative of tuberculosis.

The treatment of step (iv) may be defined in disease control policies defined by the respective Competent Authorities. For example, where the subject is non-human, the treatment of step (iv) may comprise culling of the non-human subject. Humans testing positive may be treated with appropriate anti-tuberculosis drugs, such as rifampicin, isoniazid, ethambutol, streptomycin or pyrazinamide.

It will be appreciated that the mutant *Mycobacterium* cell according to the first aspect or the vaccine according to the fourth aspect (herein known as the active agents) may be used in a medicament, which may be used as a monotherapy (i.e. use of the active agent), for preventing disease or vaccination. Alternatively, the active agents according to the invention may be used as an adjunct to, or in combination with, known therapies for preventing disease.

The mutant *Mycobacterium* cell according to the first aspect or the vaccine according to the fourth aspect may be combined in compositions having a number of different forms depending, in particular, on the manner in which the composition is to be used. Thus, for example, the composition may be in the form of a powder, tablet, capsule, liquid, ointment, cream, gel, hydrogel, aerosol, spray, micellar solution, transdermal patch, liposome suspension, polyplex, emulsion, lipid nanoparticles or any other suitable form that may be administered to a person or animal in need of treatment or vaccination. It will be appreciated that the vehicle of medicaments according to the invention should be one which is well-tolerated by the subject to whom it is given.

The mutant *Mycobacterium* cell according to the first aspect or the vaccine according to the fourth aspect may also be incorporated within a slow- or delayed-release device. Such devices may, for example, be inserted on or under the skin, and the medicament may be released over weeks or even months. The device may be located at least adjacent the treatment site. Such devices may be particularly advantageous when long-term treatment which would normally require frequent administration (e.g. at least daily injection).

In a preferred embodiment, however, medicaments according to the invention may be administered to a subject by injection into the blood stream, muscle, skin or directly into a site requiring treatment. Injections may be intravenous (bolus or infusion) or subcutaneous (bolus or infusion), or intradermal (bolus or infusion), or intramuscular (bolus or infusion).

It will be appreciated that the amount of mutant *Mycobacterium* cell according to the first aspect or the vaccine according to the fourth aspect that is required is determined by its biological activity and bioavailability, which in turn depends on the mode of administration, the physiochemical properties of the mutant *Mycobacterium* cell or vaccine. The frequency of vaccination may vary, e.g. in respect to the species being vaccinated and epidemiological context. Optimal dosages to be administered may be determined by those skilled in the art, and will vary with the particular the mutant *Mycobacterium* cell or vaccine in use, the strength of the pharmaceutical composition, the mode of administration, and the type and advancement of the bacterial infection. Additional factors depending on the particular subject being treated will result in a need to adjust dosages, including subject age, weight, gender, diet, and time of administration.

Doses may be given as a single administration (e.g. a single daily injection or inhalation of a nasal spray) . . . . Alternatively, a slow release device may be used to provide optimal doses of the mutant *Mycobacterium* cell according to the first aspect or the vaccine according to the fourth aspect to a patient without the need to administer repeated doses.

Preferably, however, the mutant *Mycobacterium* cell according to the first aspect or the vaccine according to the fourth aspect may be given as a single dose.

Known procedures, such as those conventionally employed by the pharmaceutical industry (e.g. in vivo experimentation, clinical trials, etc.), may be used to form specific formulations of the mutant *Mycobacterium* cell according to the first aspect or the vaccine according to the fourth aspect and precise therapeutic regimes (such as daily doses of the agents and the frequency of administration).

A "subject" may be a vertebrate, mammal, or domestic animal. Hence, compositions and medicaments according to the invention may be used to treat any mammal, for example livestock (e.g. a horse), pets, or may be used in other veterinary applications.

Most preferably, however, the subject is a human being or a cow.

A "therapeutically effective amount" of the mutant *Mycobacterium* cell according to the first aspect or the vaccine according to the fourth aspect is any amount which, when administered to a subject, is the amount of the aforementioned that is needed to prevent disease.

For example, the mutant *Mycobacterium* cell according to the first aspect or the vaccine according to the fourth aspect may be used from about $1\times10^4$ CFU to $1\times10^8$ CFU, and preferably from about $0.2\times10^6$ CFU to about $1\times10^6$ CFU. It is preferred that the amount of mutant *Mycobacterium* cell according to the first aspect or the vaccine according to the fourth aspect is an amount from about $2\times10^5$ CFU and $8\times10^5$, CFU.

A "pharmaceutically acceptable vehicle" as referred to herein, is any known compound or combination of known compounds that are known to those skilled in the art to be useful in formulating pharmaceutical compositions.

In one embodiment, the pharmaceutically acceptable vehicle may be a solid, and the composition may be in the form of a powder or tablet. A solid pharmaceutically acceptable vehicle may include one or more substances which may also act as flavouring agents, lubricants, solubilisers, suspending agents, dyes, fillers, glidants, compression aids, inert binders, sweeteners, preservatives, dyes, coatings, or tablet-disintegrating agents. The vehicle may also be an encapsulating material. In powders, the vehicle is a finely divided solid that is in admixture with the finely divided active agents according to the invention. In tablets, the active agent (e.g. mutant *Mycobacterium* cell according to the first aspect or the vaccine according to the fourth aspect) may be mixed with a vehicle having the necessary compression properties in suitable proportions and compacted in the shape and size desired. The powders and tablets preferably contain up to 99% of the active agents. Suitable solid vehicles include, for example calcium phosphate, magnesium stearate, talc, sugars, lactose, dextrin, starch, gelatin, cellulose, polyvinylpyrrolidine, low melting waxes and ion exchange resins. In another embodiment, the pharmaceutical vehicle may be a gel and the composition may be in the form of a cream or the like.

However, the pharmaceutical vehicle may be a liquid, and the pharmaceutical composition is in the form of a solution. Liquid vehicles are used in preparing solutions, suspensions, emulsions, syrups, elixirs and pressurized compositions. The mutant *Mycobacterium* cell according to the first aspect or the vaccine according to the fourth aspect may be dissolved or suspended in a pharmaceutically acceptable liquid vehicle such as water, an organic solvent, a mixture of both or pharmaceutically acceptable oils or fats. The liquid vehicle can contain other suitable pharmaceutical additives such as solubilisers, emulsifiers, buffers, preservatives, sweeteners, flavouring agents, suspending agents, thickening agents, colours, viscosity regulators, stabilizers or osmo-regulators. Suitable examples of liquid vehicles for oral and parenteral administration include water (partially containing additives as above, e.g. cellulose derivatives, preferably sodium carboxymethyl cellulose solution), alcohols (including monohydric alcohols and polyhydric alcohols, e.g. glycols) and their derivatives, and oils (e.g. fractionated coconut oil and arachis oil). For parenteral administration, the vehicle can also be an oily ester such as ethyl oleate and isopropyl myristate. Sterile liquid vehicles are useful in sterile liquid form compositions for parenteral administration. The liquid vehicle for pressurized compositions can be a halogenated hydrocarbon or other pharmaceutically acceptable propellant.

Liquid pharmaceutical compositions, which are sterile solutions or suspensions, can be utilized by, for example, subcutaneous, intradermal, intrathecal, epidural, intraperitoneal, intravenous and particularly intramuscular injection. The nucleic acid sequence, or expression cassette of the invention may be prepared as a sterile solid composition that may be dissolved or suspended at the time of administration using sterile water, saline, or other appropriate sterile injectable medium.

The mutant *Mycobacterium* cell according to the first aspect or the vaccine according to the fourth aspect may be administered orally in the form of a sterile solution or suspension containing other solutes or suspending agents (for example, enough saline or glucose to make the solution isotonic), bile salts, acacia, gelatin, sorbitan monoleate, polysorbate 80 (oleate esters of sorbitol and its anhydrides copolymerized with ethylene oxide) and the like. The mutant *Mycobacterium* cell according to the invention can also be administered orally either in liquid or solid composition form. Compositions suitable for oral administration include solid forms, such as pills, capsules, granules, tablets, and powders, and liquid forms, such as solutions, syrups, elixirs, and suspensions. Forms useful for parenteral administration include sterile solutions, emulsions, and suspensions.

It will be appreciated that the invention extends to any nucleic acid or peptide or variant, derivative or analogue thereof, which comprises substantially the amino acid or nucleic acid sequences of any of the sequences referred to herein, including variants or fragments thereof. The terms "substantially the amino acid/nucleotide/peptide sequence", "variant" and "fragment", can be a sequence that has at least 40% sequence identity with the amino acid/nucleotide/peptide sequences of any one of the sequences referred to herein, for example 40% identity with the sequence identified as SEQ ID Nos: 1-40 and so on.

Amino acid/polynucleotide/polypeptide sequences with a sequence identity which is greater than 65%, more preferably greater than 70%, even more preferably greater than 75%, and still more preferably greater than 80% sequence identity to any of the sequences referred to are also envisaged. Preferably, the amino acid/polynucleotide/polypeptide sequence has at least 85% identity with any of the sequences referred to, more preferably at least 90% identity, even more preferably at least 92% identity, even more preferably at least 95% identity, even more preferably at least 97% identity, even more preferably at least 98% identity and, most preferably at least 99% identity with any of the sequences referred to herein.

The skilled technician will appreciate how to calculate the percentage identity between two amino acid/polynucleotide/polypeptide sequences. In order to calculate the percentage identity between two amino acid/polynucleotide/polypeptide sequences, an alignment of the two sequences must first be prepared, followed by calculation of the sequence identity value. The percentage identity for two sequences may take different values depending on: —(i) the method used to align the sequences, for example, ClustalW, BLAST, FASTA, Smith-Waterman (implemented in different programs), or structural alignment from 3D comparison; and (ii) the parameters used by the alignment method, for example, local vs global alignment, the pair-score matrix used (e.g. BLOSUM62, PAM250, Gonnet etc.), and gap-penalty, e.g. functional form and constants.

Having made the alignment, there are many different ways of calculating percentage identity between the two sequences. For example, one may divide the number of identities by: (i) the length of shortest sequence; (ii) the length of alignment; (iii) the mean length of sequence; (iv) the number of non-gap positions; or (v) the number of equivalenced positions excluding overhangs. Furthermore, it will be appreciated that percentage identity is also strongly length dependent. Therefore, the shorter a pair of sequences is, the higher the sequence identity one may expect to occur by chance.

Hence, it will be appreciated that the accurate alignment of protein or DNA sequences is a complex process. The popular multiple alignment program ClustalW (Thompson et al., 1994, Nucleic Acids Research, 22, 4673-4680; Thompson et al., 1997, Nucleic Acids Research, 24, 4876-4882) is a preferred way for generating multiple alignments of proteins or DNA in accordance with the invention. Suitable parameters for ClustalW may be as follows: For DNA alignments: Gap Open Penalty=15.0, Gap Extension Penalty=6.66, and Matrix=Identity. For protein alignments: Gap Open Penalty=10.0, Gap Extension Penalty=0.2, and Matrix=Gonnet. For DNA and Protein alignments: END-GAP=-1, and GAPDIST=4. Those skilled in the art will be aware that it may be necessary to vary these and other parameters for optimal sequence alignment.

Preferably, calculation of percentage identities between two amino acid/polynucleotide/polypeptide sequences may then be calculated from such an alignment as $(N/T)*100$, where N is the number of positions at which the sequences share an identical residue, and T is the total number of positions compared including gaps and either including or excluding overhangs. Preferably, overhangs are included in the calculation. Hence, a most preferred method for calculating percentage identity between two sequences comprises (i) preparing a sequence alignment using the ClustalW program using a suitable set of parameters, for example, as set out above; and (ii) inserting the values of N and T into the following formula: —Sequence Identity=$(N/T)*100$.

Alternative methods for identifying similar sequences will be known to those skilled in the art. For example, a substantially similar nucleotide sequence will be encoded by a sequence which hybridizes to DNA sequences or their complements under stringent conditions. By stringent conditions, the inventors mean the nucleotide hybridises to filter-bound DNA or RNA in 3× sodium chloride/sodium citrate (SSC) at approximately 45° C. followed by at least one wash in 0.2×SSC/0.1% SDS at approximately 20-65° C. Alternatively, a substantially similar polypeptide may differ by at least 1, but less than 5, 10, 20, 50 or 100 amino acids from the sequences shown in, for example, in those of SEQ ID Nos: 1 to 40 that are amino acid sequences.

Due to the degeneracy of the genetic code, it is clear that any nucleic acid sequence described herein could be varied or changed without substantially affecting the sequence of the protein encoded thereby, to provide a functional variant thereof. Suitable nucleotide variants are those having a sequence altered by the substitution of different codons that encode the same amino acid within the sequence, thus producing a silent (synonymous) change. Other suitable variants are those having homologous nucleotide sequences but comprising all, or portions of, sequence, which are altered by the substitution of different codons that encode an amino acid with a side chain of similar biophysical properties to the amino acid it substitutes, to produce a conservative change. For example, small non-polar, hydrophobic amino acids include glycine, alanine, leucine, isoleucine, valine, proline, and methionine. Large non-polar, hydrophobic amino acids include phenylalanine, tryptophan and tyrosine. The polar neutral amino acids include serine, threonine, cysteine, asparagine and glutamine. The positively charged (basic) amino acids include lysine, arginine and histidine. The negatively charged (acidic) amino acids include aspartic acid and glutamic acid. It will therefore be appreciated which amino acids may be replaced with an amino acid having similar biophysical properties, and the skilled technician will know the nucleotide sequences encoding these amino acids.

All of the features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying Figures, in which: —

Figure 1B:
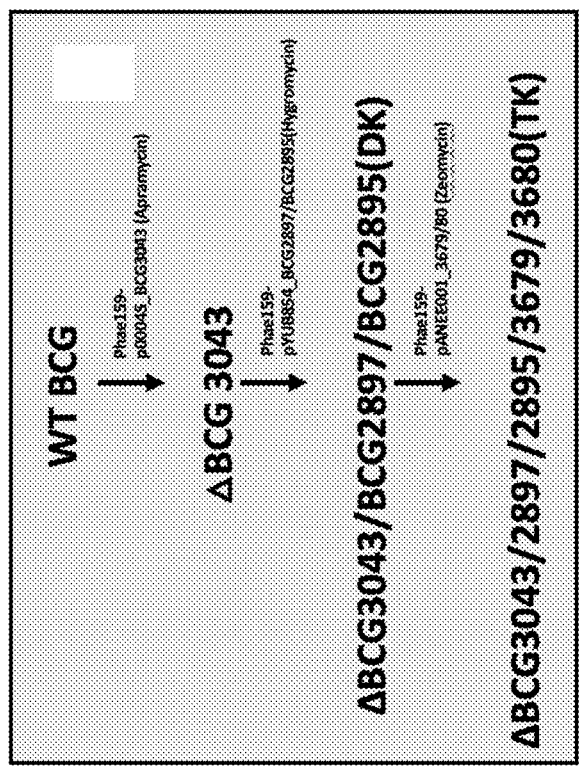

FIG. 1A shows bean plot of fold changes during in vivo passage in cattle for selected gene groups and FIG. 1B Schematic representation of creating ΔBCG TK. FIG. 1A Black lines show the medians; white lines represent individual antigenic genes; polygons represent the estimated density of the data. The grey region is a density plot of the data's distribution. Values are normalised to the median value of the 'All gene' group. The plots were created with BoxPlotR (Spitzer, Wildenhain et al. 2014) FIG. 1B ΔBCG TK was created by sequential gene knock out using specialized Transduction method (Bardov et al. 2002). The Phagemid used was Phae159 and the cosmids used were p0004S, pYUB854 and pANEE001 to create ΔBCG 3043, ΔBCG3043/BCG2897/BCG2895 (Double knock out) and ΔBCG3043/2897/2895/3679/3680 (Triple knock out) respectively.

FIGS. 2A-2B show competitive survival of selected mutants in vitro and ex vivo conditions. Competitive in vitro survival of selected mutants in FIG. 2A media and FIG. 2B bovine macrophages. Approximately equal number of WT BCG Danish and BCG knockout were mixed and used to inoculate media, infect PBMC derived bovine macrophages. Inoculants and recovered BCG were enumerated on selective media. Error bars represent standard errors.

FIGS. 3A-3C show comparative analysis of body weight and survival ability of ΔBCG TK vaccinated Guinea pigs after *M. bovis* challenge. FIG. 3A Schematic representation of study schedule FIG. 3B Group mean body weight profiles recorded for each group of guinea pigs during the vaccination and challenge phase of the study. Solid red vertical bar on x-axis indicates the time point of vaccination and dashed-black vertical bar on x-axis indicates time point of challenge with *M. bovis*. FIG. 3C Survival data of unvaccinated and vaccinated (WT BCG, ΔBCG TK) guinea pigs up on *M. bovis* infection.

FIGS. 4A-4B show protective efficacy of ΔBCG TK vaccination in Guinea pigs upon *M. bovis* challenge. FIG. 4A The bacterial load in the lungs of WT BCG (P=0.0021) and ΔBCG TK (P=0.0006) vaccinated guinea pigs is significantly low compared to the with the unvaccinated control group. FIG. 4B The bacterial load in spleen of WT BCG (P=0.0015) and ΔBCG TK (P=0.0006) vaccinated guinea pigs is significantly low compared to the unvaccinated control group. Values for each individual are shown and the horizontal bar denotes the mean for each group. * P=$0.05, P=≤0.01, ***P=≤0.001.

FIGS. 5A-5E show pre and post-challenge skin test reaction in ΔBCG TK vaccinated guinea pigs. FIG. 5A Diagram to show the injection layout on animal. At least 2.5 cm between each inoculation given on the same flank. FIGS. 5B & 5C Pre-challenge skin test: The group mean size of the diameter of erythema at 24 FIG. 5B and at 48 hours FIG. 5C after injection. Post-challenge skin test: the mean size of the diameter of erythema at 24 FIG. 5D and 48 FIG. 5E hours after injection. The dotted line denotes the minimum skin test response (STR) threshold (2 mm) for DIVA antigens to consider it as positive. The x-axis denotes the vaccine group. The error bars indicate standard deviation for each vaccine group.

Figure 6:
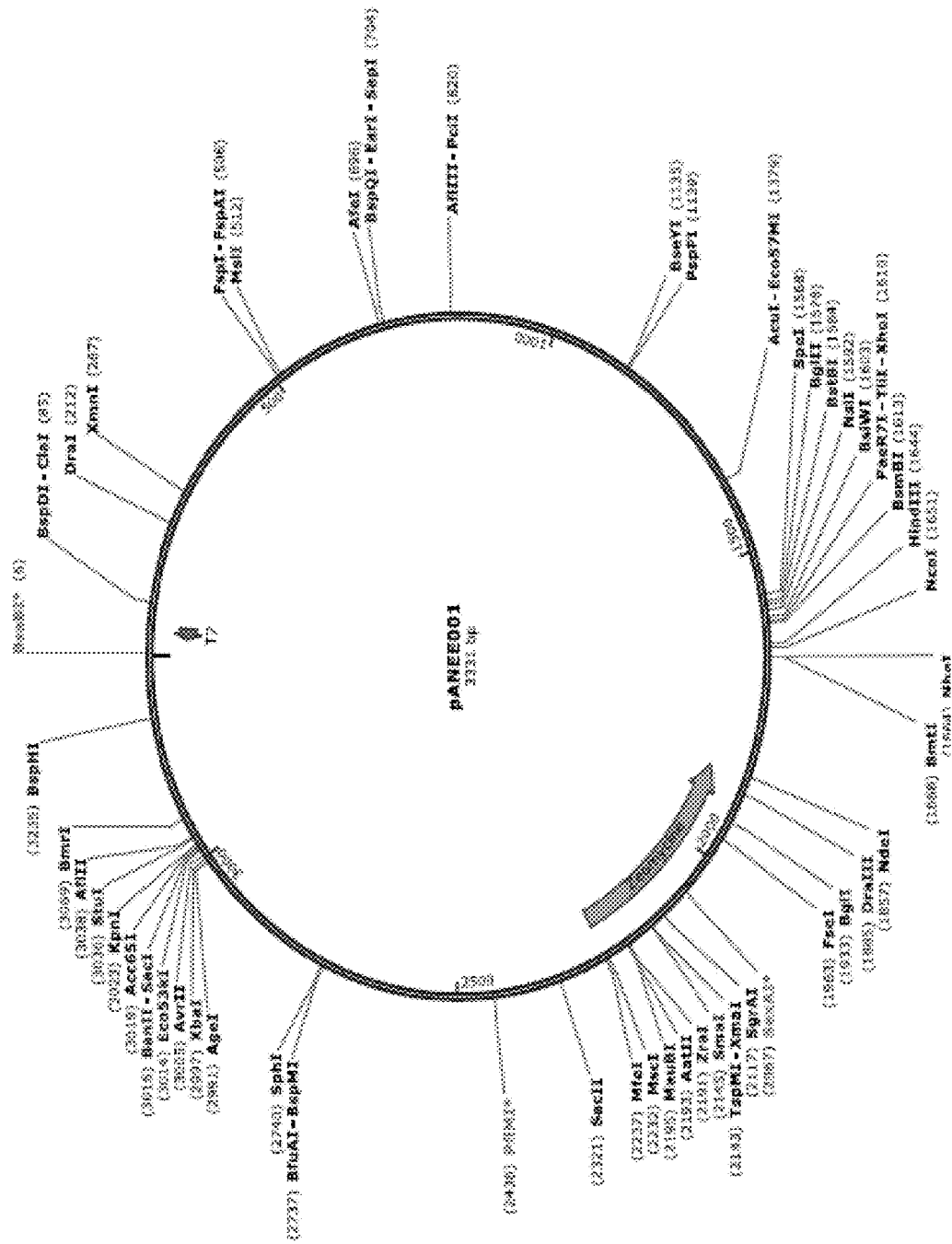

FIG. 6 shows the cosmid map of pANEE001. The map was generated using Snap gene viewer. In this plasmid, Zeocin antibiotic cassette is flagged with MfeI and NdeI restriction sites at 3' and 5' respectively which enable the user to change the antibiotic cassette as required.

Figure 7A:
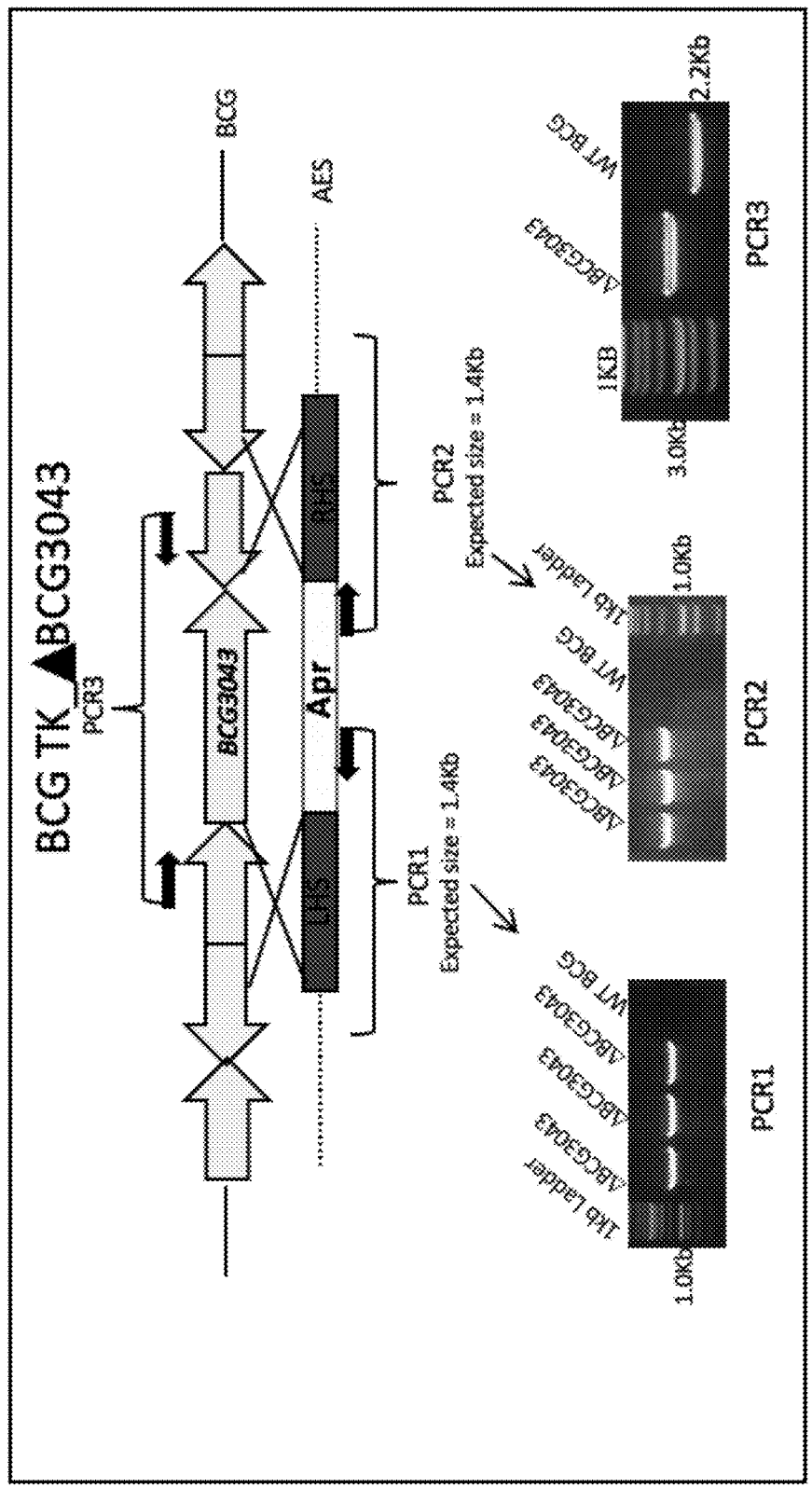
Figure 7B:
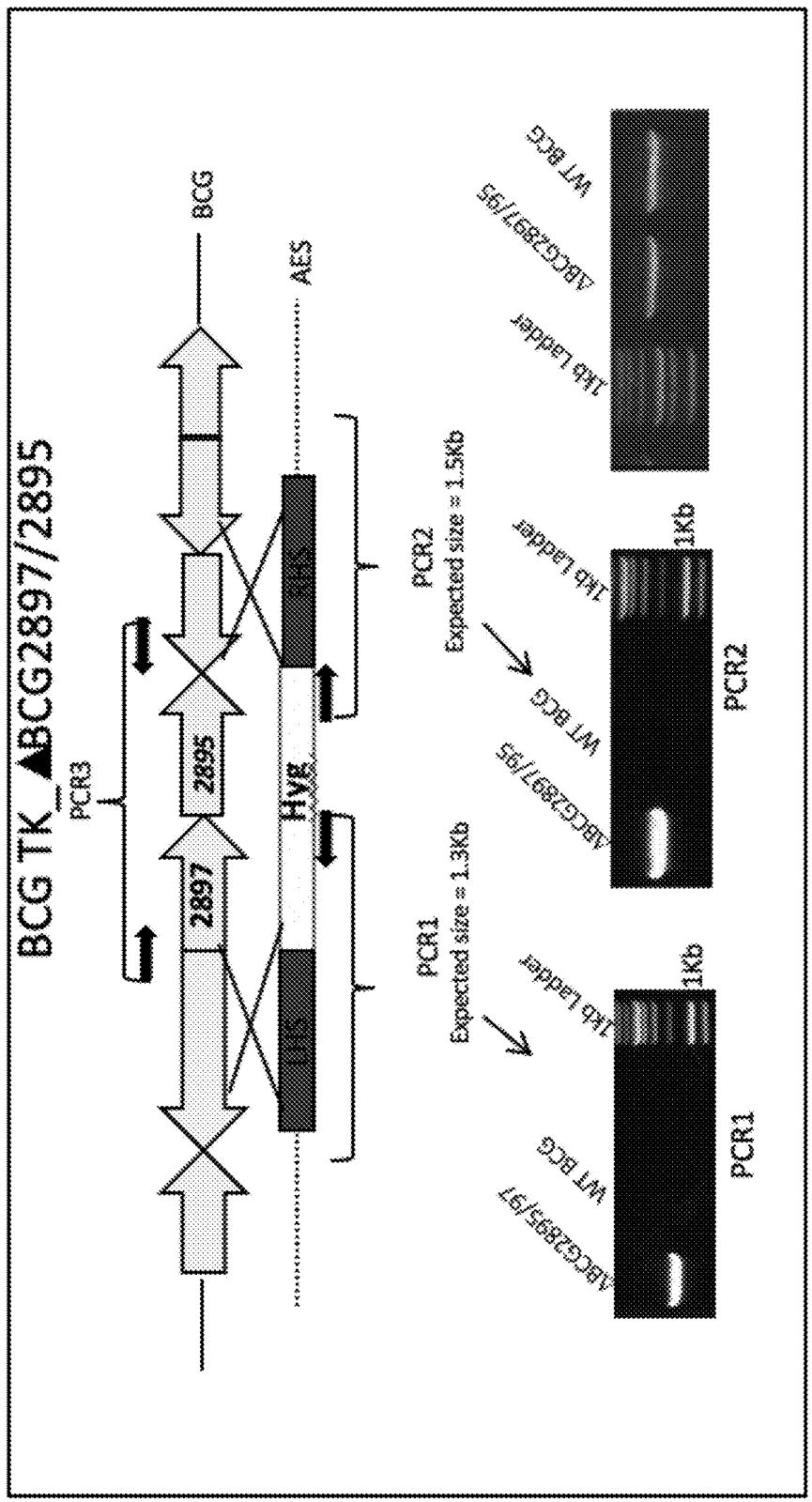
Figure 7C:
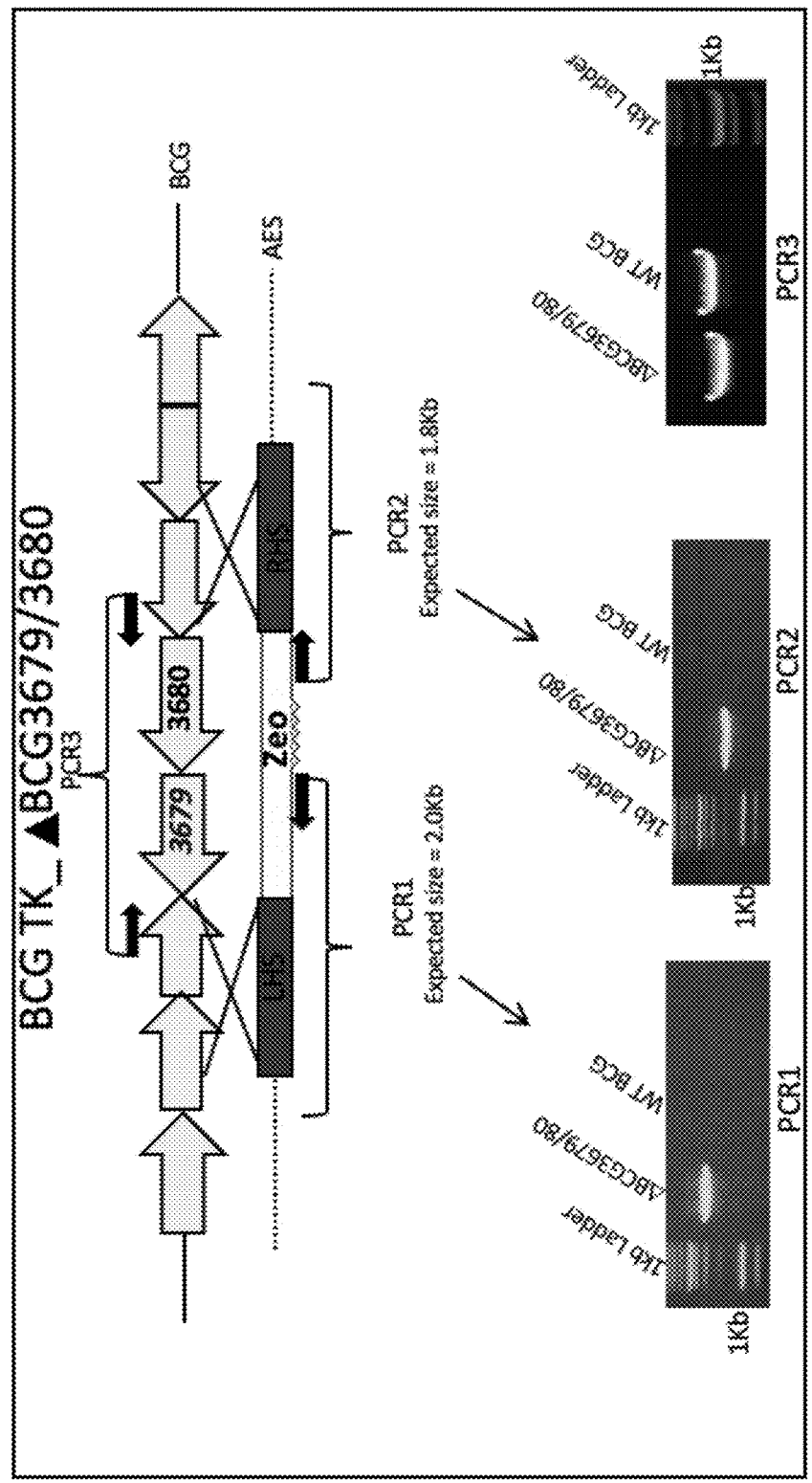

FIGS. 7A-7C show the confirmation of DBCG TK genotype by PCR. FIG. 7APCR products of the expected size were obtained for the mutants with CG3043_LF_CHK_R and BCG3043_LF_F (PCR1), and using BCG3043_RF_CHK_R and CG3043_RF_R (PCR2); no products were obtained with wild type (PCRs 1 & 2). PCR over the BCG3043 gene using BCG3043_LF_F and BCG3043_RF_R further confirms the correct insertion of the Apramycine cassette (PCR3). FIG. 7BPCR products of the expected size were obtained for the mutants with MPB70/83_LF_CHK_R and MPB70/83_LF_F (PCR1), and using MPB70/83_RF_CHK_R and MPB70/83_RF_R (PCR2); no products were obtained with wild type (PCRs 1 & 2). PCR over the BCG2897/95 gene using MPB70/83_LF_F and MPB70/83_RF_R further confirms the correct insertion of the Hygromycin cassette (PCR3). FIG. 7CPCR products of the expected size were obtained for the mutants with BCG3679/80_LF_CHK_R and BCG3679/80_LF_F (PCR1), and using BCG3679/80_RF_CHK_R and BCG3679/80_RF_R (PCR2); no products were obtained with wild type (PCRs 1 & 2). PCR over the BCG3679/80 gene using BCG3679/80_LF_F and BCG3679/80_RF_R further confirms the correct insertion of the Zeocin cassette (PCR3). All PCR products were run on 1% agarose gel and imaged using a UVP gel doc machine. The schematic representations of genes are not to the scale. The empty spaces around the edges of gel images were trimmed for better representation. The untrimmed version of gel images were given below with exact same order as above images in FIG. 8.

Figure 8:
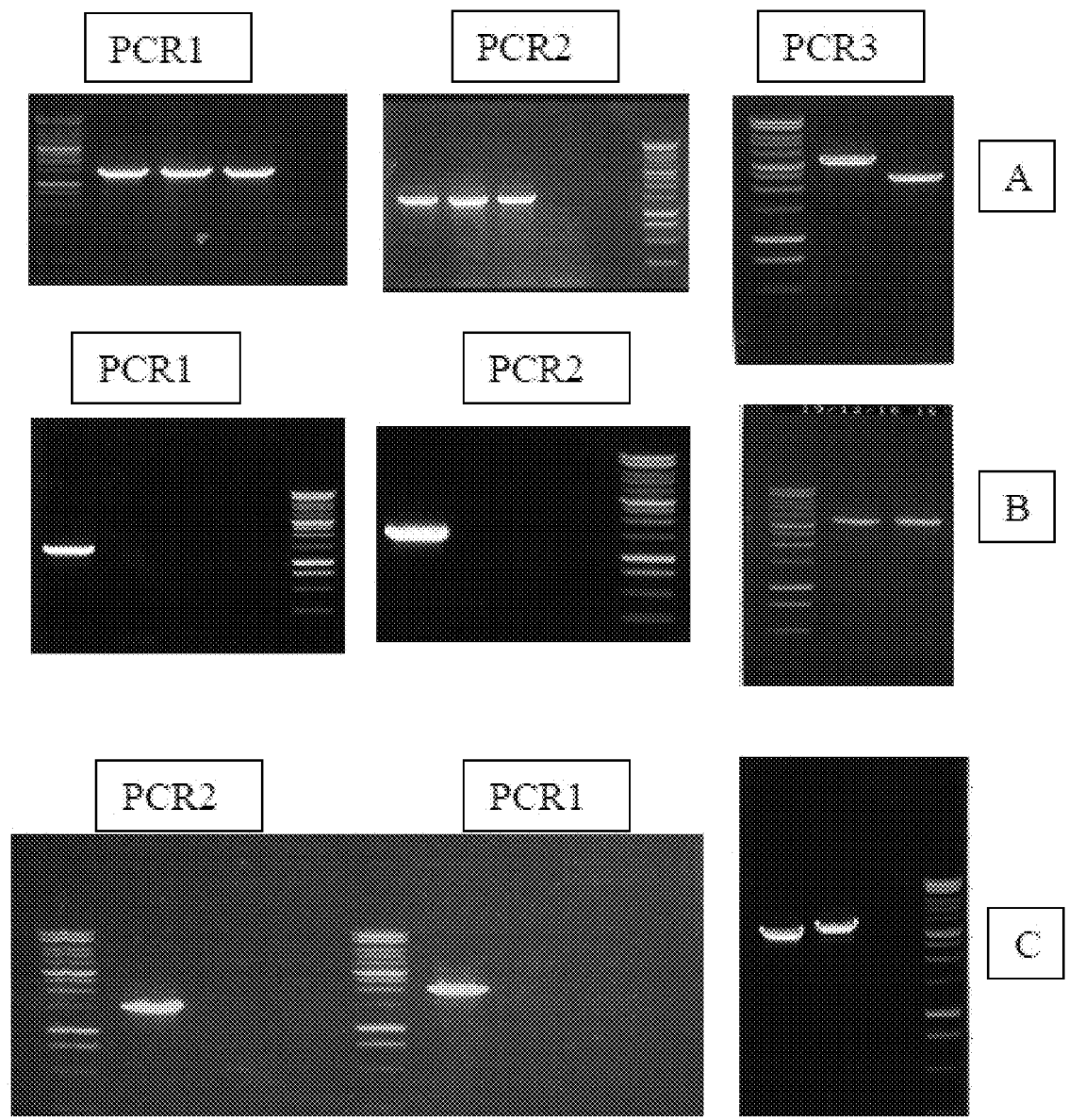

FIG. 8 shows the confirmation of DBCG TK genotype by PCR. The untrimmed version of gel images of FIG. 7 representing in the exact same order as FIG. 7.

Figure 9B:
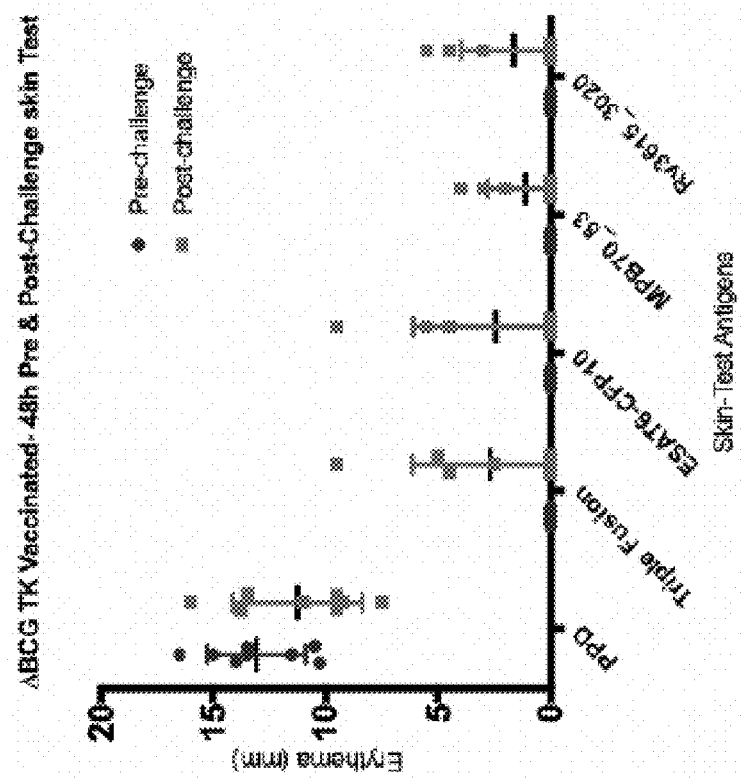
Figure 9A:
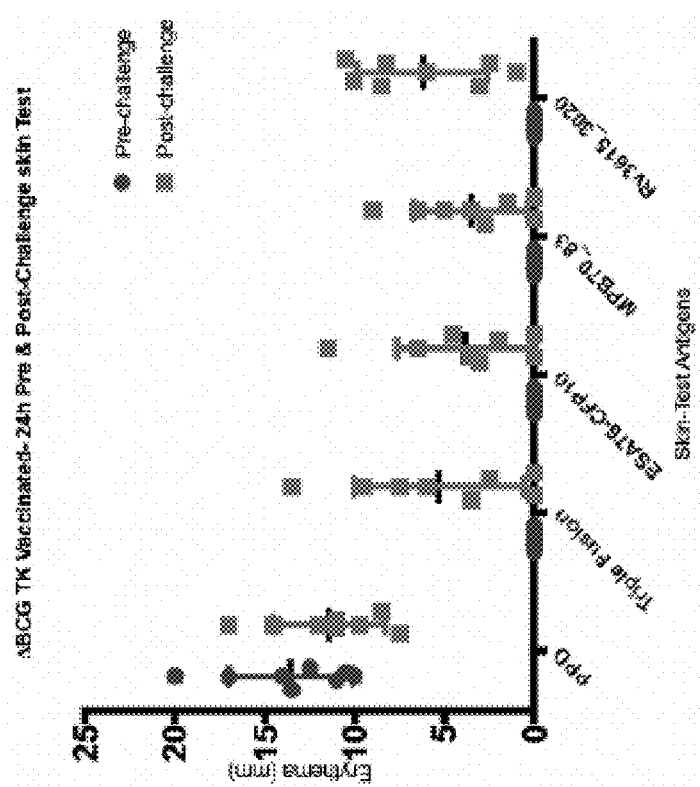
Figure 9D:
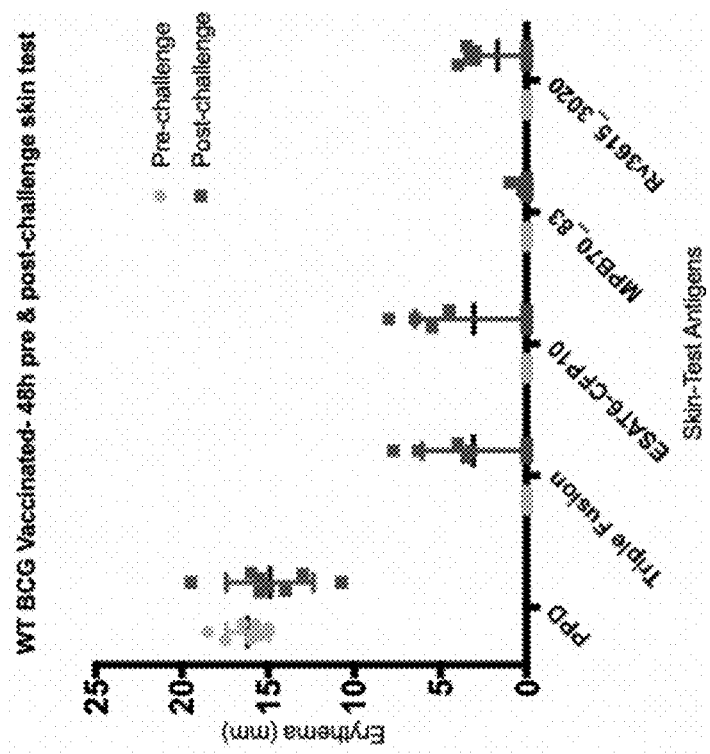
Figure 9C:
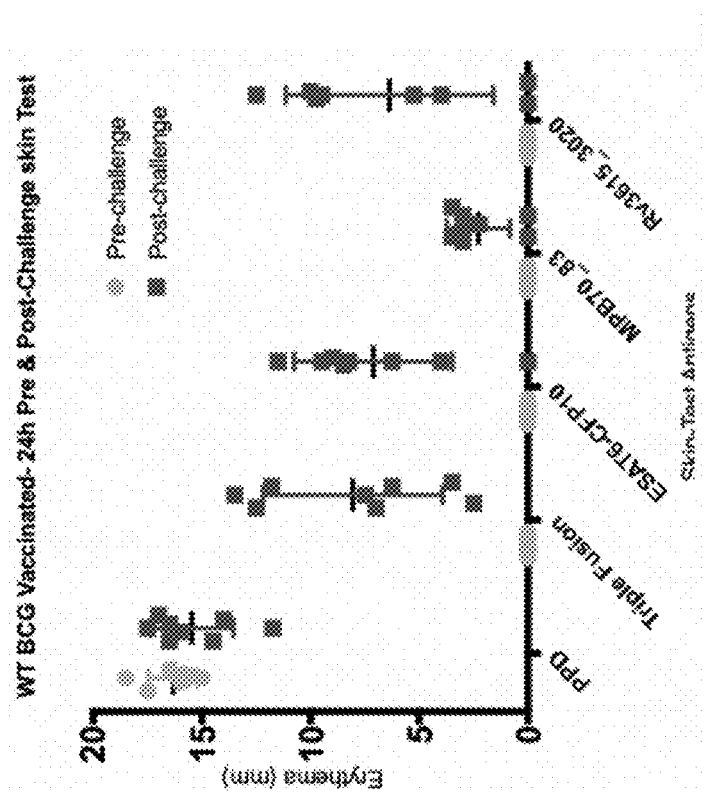

FIGS. 9A-9E show Pre- and Post-M. bovis challenge skin test at 24 h and 48 h against immunodominant antigens. FIG. 9A, 9B The size of erythema against PPD and Fusion antigens in the vaccinate guinea pigs, pre and post M. bovis challenge. FIG. 9C The size of erythema against PPD and Fusion antigens in the unvaccinated guinea pigs, pre and post M. bovis challenge. The error bars indicate standard deviation for each vaccine group.

Figures 9E, 10:
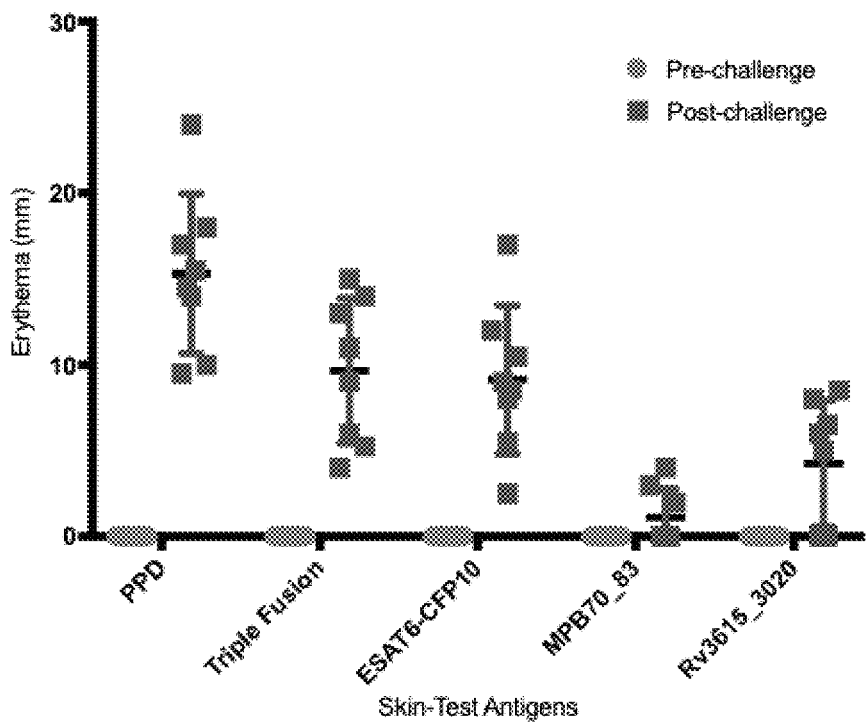

FIG. 10 shows Details of the skin test antigens. The table list the antigen components for each skin test group.

Figure 13:
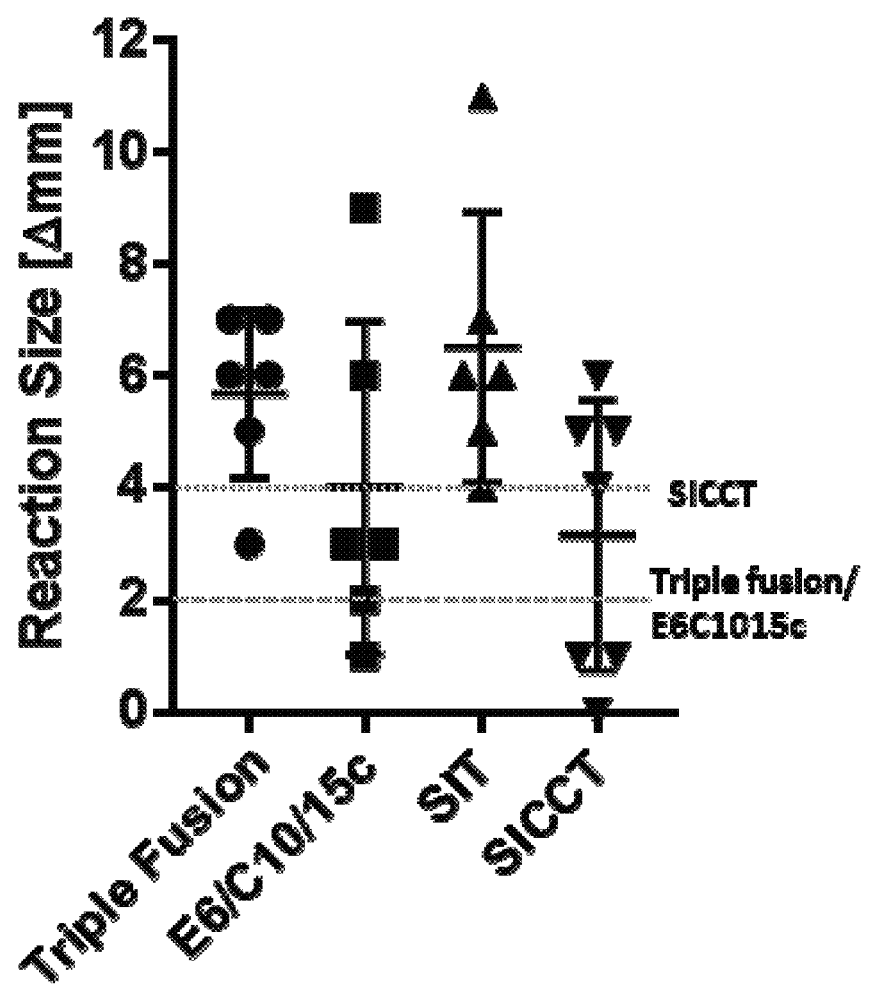

FIG. 11 (table 2) shows pre-challenge & post-challenge skin testing study design (Skin-testing injection Regime). Table shows the injection for each antigen preparations (coded A-E) for each group of animals. Antigen preparation group Key-A: PPD-B, B3: ESAT6-CFP10 fusion+MPB7-83 fusion+EspC-esxS fusion (Triple fusion), C: ESAT6-CFP10 fusion, D: MPB70-83 fusion, E3: EspC-esxS fusion FIG. 12 shows ANOVA general linear model (Latin square) statistical analysis to determine the effect of skin test flank location. The # symbol denotes the statistical analysis could not generate P value as all responses were 0. NA denotes not done FIG. 13 shows skin responses induced by the triple fusion protein were also compared with those induced by a cocktail of ESAT-6/CFP10/espC (E6/C10/15c) in a small number of 6 naturally infected cattle.

EXAMPLES

The inventors aimed to generate a synergistic vaccine and diagnostic approach that would permit the vaccination of cattle without interfering with the conventional PPD-based surveillance. The inventors identified genes that were essential and those that were non-essential for persistence in bovine lymph nodes. They then inactivated selected immunogenic, but non-essential genes in BCG Danish to create a diagnostic-compatible triple knock-out ΔBCG TK strain. The protective efficacy of the ΔBCG was tested in guinea pigs experimentally infected with M. bovis by aerosol and found to be equivalent to wild-type BCG. A complementary diagnostic skin test was developed with the antigenic proteins encoded by the deleted genes which did not cross-react in vaccinated or in uninfected guinea pigs. Thus, the inventors have demonstrated the functionality of a new and improved BCG strain which retains its protective efficacy but is diagnostically compatible with a novel DIVA skin test that could be implemented in control programmes.

Materials and Methods

BCG Culture Preparation

M. bovis BCG Danish 1331 (Staten's Serum Institute, batch 111013B) was grown on Middlebrook 7H11 solid media or in Middlebrook 7H9 supplemented with 0.2% glycerol, 0.05% Tween-80 and 10% OADC at 37° C. shaking at 150 rpm in an orbital shaker. When selection was required antibiotics were used at 50 μg ml-1 for apramycin, 50 μg ml-1 for hygromycin and 25 μg ml 1 for zeocin.

Construction of the recombinant cosmids containing allelic exchange substrates (AESs) Cosmid pANE001 zeomycin (FIG. 6) was derived from pYUB854 (Hyg). The original pYUB854 cosmid was modified by replacing the hygromycin resistance cassette with zeomycin cassettes. An inverse PCR of pYUB854 with primers designed to amplify plasmid backbone less the hygromycin cassette and add NdeI and MfeI restriction ends. The zeomycin cassettes were amplified from pNCMTB plasmid and NdeI and MfeI restriction sites added to the ends. The antibiotic cassette was then cloned into pYUB854, and confirmed by Sanger sequencing. The modified a res-MfeI-zeo-NdeI-res gene cassette flanked by multiple cloning sites (MCSs) was thus created.

Construction of BCG Null Mutants

Mutants were generated sequentially using the mycobacteriophage-based method of specialized transduction (Bardarov et al, 2002), and cosmids pANE001 or p0004S. Upstream (LF) and downstream (RF) sequences flanking the genes to be mutated were PCR amplified from BCG Danish genomic DNA using Qiagen High Fidelity Taq polymerase according to manufacturer's instructions, cloned into the appropriate cosmids and confirmed by Sanger sequencing to generate the knock-out plasmids p0004S3043 (Apra), pANE3679/80 (Zeo) and pYUB2897/95 (Hyg). Primer sequences are listed below:

Zeo_casset_F
SEQ ID No: 16
GAACTCCAATTGATGGCCAAGTTGACCAGTGC

Zeo_casset_R
SEQ ID No: 17
GAACTCCATATGTCAGTCCTGCTCCTCGGCCAC pYUB_inv_F
SEQ ID No: 18
GACATCCAATTGTCACAGCGGACCTCTATTC pYUB_inv_R
SEQ ID No: 19
GATCTCCATATGAACTGGCGCAGTTCCTCTGG BCG3043_RF_F
SEQ ID No: 20
GATCTCAAGCTTTCCTTCCAATTCGAATC BCG3043_RF_R
SEQ ID No: 21
GATCTCACTAGTTGGTGGCGACGAATTTC BCG3043_LF_F
SEQ ID No: 22
GATCTCCTTAAGCCAACCACGCCACATAC BCG3043_LF_R
SEQ ID No: 23
GATCTCTCTAGATGCTCGGAATGAAAAGG MPB70/83_RF_F
SEQ ID No: 24
GATCTCAAGCTTATGCCTCCGGCGTAATC MPB70/3_RF_R
SEQ ID No: 25
GATCTCACTAGTGAGCCCTGACCATTTCC MPB70/83_LF_F
SEQ ID No: 26
GATCTCCTTAAGGCTCGTCAGCGACGGC MPB70/83_LF_R
SEQ ID No: 27
GATCTCTCTAGAACCAGTGATTCGGAGTG BCG3679/80_RF_F
SEQ ID No: 28
GATCTCAAGCTTCCTGACCACGTTTGCTGC BCG3679/80_RF_R
SEQ ID No: 29
GATCTCACTAGTCGTGCTCTATTAATGCTG BCG3679/80_LF_F
SEQ ID No: 30
GATCTCCTTAAGTCTATCAGTAGGCGGCTAG BCG3645/46_LF_R
SEQ ID No: 31
GATCTCTCTAGAAACTGCGCTGCGACAATG BCG3043_RF_CHK_F
SEQ ID No: 32
GTCGTTGCAGAGTGCGGTGG BCG3043_LF_CHK_R
SEQ ID No: 33
CCAATAATGTTGAAACCCAGG MPB70/83_RF_CHK_F
SEQ ID No: 34
CCAGCGATTCCTTGTTG MPB70/83_LF_CHK_R
SEQ ID No: 35
CAAAACACGAACAAGTGAGG BCG3679/80_RF_CHK_F
SEQ ID No: 36
AAATCGCGTACGTGG BCG3679/80_RF_CHK_R
SEQ ID No: 37
GAAGTGCACGCAGTTGCC BCG3679/80_LF_CHK_F
SEQ ID No: 38
CAAGTTGACCAGTGCCGTTC BCG3679/80_LF_CHK_R
SEQ ID No: 39
CAATTGAGTCATCCAGCG Confirmation of Mutant Construction Knockouts genotypes were confirmed by PCR using primers outside the upstream and downstream flanking regions both alone, and in combination with antibiotic cassette specific primers, such that PCR products would be obtained only if the antibiotic cassette was inserted in the required genomic location.

Growth Analysis of Strains

BCG wild-type and mutant strains were grown to mid-log phase (OD 0.8). The cells were then washed twice with PBS, resuspended in PBS and used to inoculate fresh to a starting OD of 0.05. Growth was analysed by taking OD readings. All analyses were performed in triplicate except where stated.

In Vitro Competition Assays

A mix of strains containing approximately equal amounts of the ΔBCG TK mutant and WT BCG Danish were inoculated into broth and cultured for 14 days. At selected time points the numbers of each mutant were determined by serially diluting onto selective media. Numbers of WT BCG were estimated by subtracting the antibiotic resistant colony numbers from counts from plates without antibiotics. The assays were repeated three times.

Bovine Macrophage Preparations and Infections

Heparin-anticoagulated blood was collected from adult cows and peripheral blood mononuclear cells (PBMCs) isolated using Ficoll-Histopaque density gradient centrifugation from which the monocytes were isolated using CD14 MicroBeads (Miltenyi Biotec). The monocytes were differentiated into macrophages in 24 well plates containing complete RPMI supplemented with 1% sodium pyruvate, 1% penicillin/streptomycin and 20 ng ml-1 macrophage colony-stimulating factor (Miltenyi Biotec). Fresh medium was added at day 3 before being infected on day 6 at an MOI of 1 with a mixed BCG culture containing approximately equal amounts of WT BCG and ΔBCG TK mutant. Control macrophages were incubated with culture medium only. After 4 h, the infected cells were washed three times with PBS. The intracellular bacilli were harvested by lysing the cells with 0.1% Triton X-100 at different time points. The mixed culture used for infection, and harvested intracellular bacilli were enumerated as described for the in vitro competition assay. The assays were repeated three times.

Cloning and Expression of Recombinant Proteins

Coding sequence of ESAT-6 and CFP-10, and of Rv3615c and Rv3020 of *M. tuberculosis* H37Rv were synthesized as fusion gene construct (GenScript, USA) and cloned into prokaryotic expression vector pET28a (Novagen) and transformed into *E. coli* BL21 DE3 cells (Invitrogen). The protein expression was induced with 1 mM IPTG over-night at 25° C. The His6 tagged ESAT-6::CFP10 and Rv3615c::Rv3020 fusion proteins were purified from the soluble fraction of the bacterial lysate using Ni-NTA agarose (immobilized metal affinity chromatography). Briefly, a 5 ml Ni-NTA agarose column was equilibrated with 10 column volumes of Tris buffered saline (TBS) and the soluble fraction of the bacterial lysate was passed through the column and the column was washed with 20 column volumes of TBS containing 50 mM imidazole and the recombinant protein was eluted using 500 mM imidazole. The pooled protein fractions were dialyzed against PBS (pH 7.4) and purity of the protein was assessed using SDS-PAGE. The protein was identified in a Western blot using anti-His6 antibody.

LPS Removal from the Purified TB Antigens

LPS from recombinant fusion proteins was removed using Triton X-100 as per the procedure 56. Briefly, Triton X-100 was added to the protein sample to a final concentration of 1% (v/v) and incubated at 4° C. for 1 h with continuous mixing. The sample was centrifuged at 6000 rcf for 10 min at 30° C. and the upper phase was collected without disturbing the LPS rich middle and lower phase. Triton X-100 was added again to the upper phase to a final concentration of 0.5% (v/v) and the remaining steps were repeated as mentioned above. Then, the recombinant protein was analysed in SDS-PAGE and Western blot.

Guinea Pig Experiments

Studies were conducted according to the United Kingdom Home Office Legislation for animal experimentation and approved by a local ethical committee at Public Health England (Porton Down, United Kingdom). Dunkin Hartley guinea pigs free from pathogen-specific infection were randomly assigned to vaccine groups and identified using subcutaneously implanted microchips (Plexx, the Netherlands) to enable blinding of the analyses wherever possible. Group sizes were determined by statistical power calculations (Minitab, version 16) performed using previous data (SD, approximately 0.5) to reliably detect a difference of 1.0 log 10 in the median number of colony-forming units (cfu) per millilitre. The guinea pigs were housed in groups of up to eight during vaccination and in pairs post-challenge. Animals were monitored daily for behavioural changes. Behaviour was evaluated for contra-indicators including body condition, lethargy and hunching.

The 32 animals were divided into 4 groups (n=8). Groups 1 and 2 were vaccinated subcutaneously on the nape with 5×104 cfu of either ΔBCG TK (Group 1) or wild type BCG (Group 2) at day 0. Groups 3 and 4 remained unvaccinated. All groups received the pre-challenge skin tests at 34 days post-vaccination. Skin test responses (STR) were measured at 24 and 48 hours following inoculation with the antigens. Groups 1, 2 and 3 were challenged with $M.$ $bovis$ (AF2122/97) at 42 days (6 weeks) post-vaccination and received a post-challenge skin test before the scheduled cull and necropsy at 70 days (4 weeks post-challenge). Group 4 was not challenged as this was a control group to test for non-specific skin test responses. Guinea pigs in groups 1-3 were challenged by the aerosol route with a target estimated dose of 10-20 cfu of $M.$ $bovis$ using a contained Henderson apparatus in conjunction with an AeroMP control unit 57-59. Fine particle aerosols of $M.$ $bovis$, with a mean diameter of 2 μm, were generated in a Collison nebulizer and delivered directly to the snout of each animal. The AeroMP is a platform system designed to manage the aerosol generation, characterization and sampling processes via a dashboard software laptop system. Throughout the study, the body weight of each animal was measured and recorded at least weekly. The frequency of checks was increased on appearance of any clinical signs or weight loss. The humane endpoint was reached when 20% loss of maximal body weight was recorded and/or observation of defined clinical signs such as laboured breathing.

The determination of bacterial load was scheduled at 4 weeks post-challenge. Guinea pigs from each group were killed and the lungs and spleens were aseptically removed and stored at −20° C. on the day of necropsy until they were processed in a single batch. On the day of tissue processing, each tissue was homogenized in 10 ml (lung) or 5 ml (spleen) sterile phosphate buffered saline (PBS). Each tissue homogenate was serially diluted in sterile PBS and 100 μl of each dilution plated, in duplicate onto Middlebrook 7H11+OADC+pyruvate selective agar. Following incubation, colonies were enumerated to determine the colony forming units (cfu).

Skin Testing

Figure 5A:
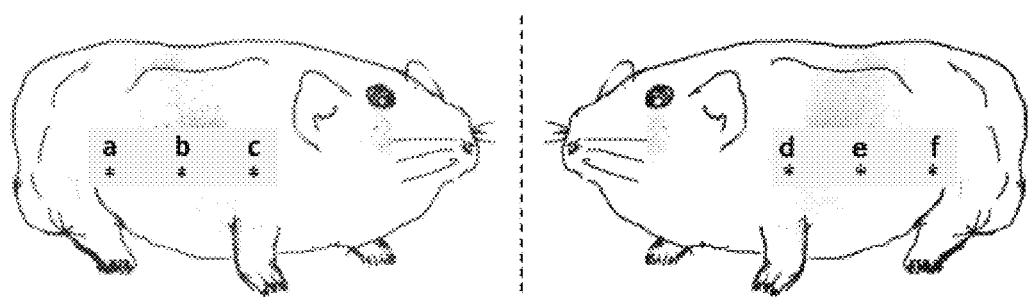

The skin testing was performed 34 days post-vaccination prior to $M.$ $bovis$ challenge (pre-challenge skin test) and at 62 days post-vaccination around 4 weeks after $M.$ $bovis$ challenge (post-challenge skin tests). All guinea pigs, regardless of vaccination and challenge status were given PPD-B (Group A) and four specific DIVA skin test antigen preparations (Group B-E) at six separate injection sites in a Latin square formation. A diagram of the six sites for each animal (three sites on each flank) is shown in FIG. 5A. The details of the group and skin test antigen are given in FIG. 10.

Each antigen cocktail was prepared prior to delivery. 100 μl of each antigen preparation (2 μg of PPD-B or 1 μg of antigen cocktail preparation) was given to the appropriate site by the intradermal route. Each guinea pig received each of the five types of antigen preparation and a repeat of one other (on opposite flank) as described in FIG. 11. The rationale to test one preparation on both flanks of each animal was to determine whether the flank side (left or right) influenced the magnitude of the inflammatory response. The inventors didn't observe any significant difference in the magnitude of the skin test response when the same test was given in different locations or on either flank which nullify the influence of the position or flank of the skin test location on the magnitude of the inflammatory response (FIG. 12).

Skin test responses were measured at 24 h and 48 h following antigen inoculation. However overall reactions were observed with the recombinant proteins. As the inventors expected that reaction sizes to recombinant proteins were lower than to PPD, based on the observations in cattle by 32 the inventors defined cut-off values for positivity for the recombinant proteins at both time points at >2 mm, and >4 mm for PPD. The size of the individual erythema reactions (if present) was measured in millimetres (mm) and the average of these values was used for analysis. Skin test data were initially analysed using an ANOVA general linear model (Latin square) statistical analysis. Group comparisons of the magnitude of skin test were performed using the non-parametric Mann-Whitney test (Minitab software version 16). A test for normality was applied to the bacterial load data and the data from each vaccine group were compared and ranked using the non-parametric Mann-Whitney test (Minitab software version 16).

Results

The starting point for the inventor's experiments was the identification of genes that influence survival of BCG in the bovine lymph node. The details of these experiments are fully described elsewhere[60], with the method based on the original BCG lymph node challenge model[36]. Briefly, a BCG Danish transposon (Tn) library was constructed and inoculated into the left and the right prescapular lymph nodes of three calves. The library was recovered from lymph nodes after 3 weeks and the input and output library pools were compared by Tn-seq to identify genes that, when inactivated by the transposon, influenced persistence in bovine lymph nodes[60]. Genes that did not influence persistence were thereby dispensable and therefore candidate targets for deletion to construct a ΔBCG strain. These were identified using the TRANSIT's Resampling method analysis[37]. Genes in this list that encoded antigens were identified by cross-checking against a list of 500 proteins whose immunoreactivity in TB-infected cows has been already characterized[38,39] to identify dispensable antigenic proteins.

Five genes encoding antigens were identified as Tn mutants in the library whose fold changes during in vivo passage in cattle was between 0.5 to 2 fold (FIG. 1A), indicating that they were not essential for persistence in the bovine lymph condition, and which could be eliminated from the genome via three genome deletions. The genes were BCG3043, BCG2897, BCG2895, BCG3679 and BCG3680 which are orthologs of M. tb genes Rv3020c, MPT70, MPT83, Rv3615c and Rv3616c, respectively. Rv3020c is a member of the ESX family of virulence factors known to induce a potent cellular immune responses[40]. Rv3615c [Esx-1 substrate protein C (EspC)], encoded outside of RD1, is an antigen that is already part of the DIVA skin test prototyope described by Whelan et al., 2010[32]. The MPB70 and MPB83 antigens were reported to be highly specific and sensitive for the detection of M. bovis infection in animals without any cross-reaction with Mycobacterium spp. found in the environment[41-43]. Lastly, Rv3616c is a CD8 antigen in mice with characteristics of the Esx family of bacterial proteins[44]. It is also strongly recognised by T cells from infected cattle[45]. The inventors therefore chose to delete these genes from BCG Danish.

Construction of Modified ΔBCG TK Vaccine

All 5 antigen genes were removed using specialized transduction method[46] by three sequential deletion steps each using vectors with different antibiotic cassettes for the selection of mutants at each stage (FIG. 1B) to make a triple knockout, ΔBCG TK mutant. PCR analysis of the genetic constructs[47] constructed to make the deletion mutants were all of the expected size (FIG. 11).

Figure 2B:
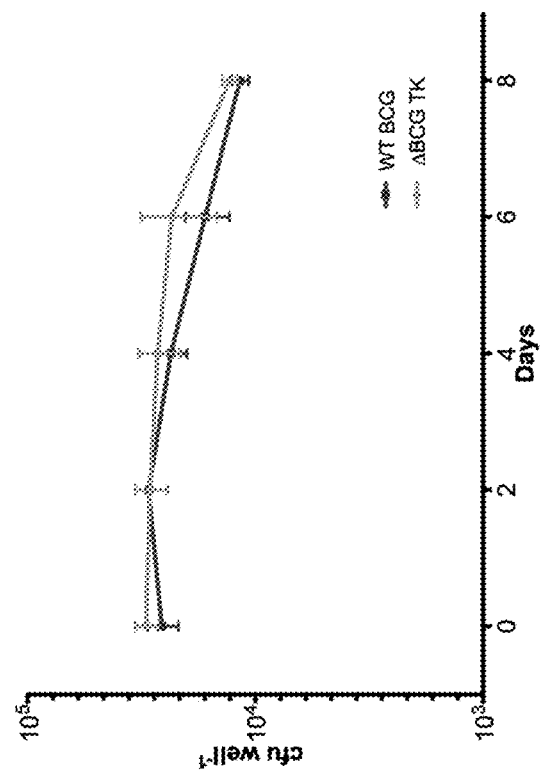
Figure 2A:
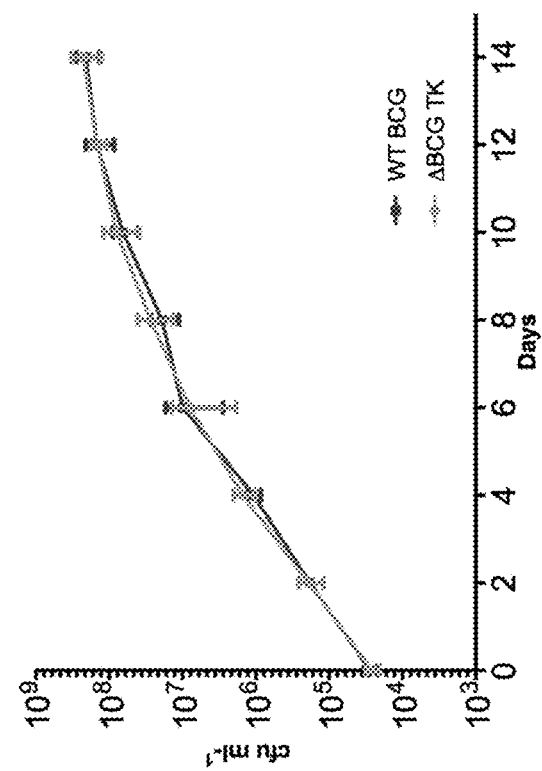

Growth Analysis of ΔBCG TK Mutants in Standard Growth Medium and in Bovine Macrophages To confirm that the deletion of the genes did not have any growth defect, the inventors first tested the in vitro growth kinetics of the mutant strain compared to WT BCG in a competition assay. When co-cultured with wild type BCG in 7H9 media the TK mutant did not show any loss of fitness when compared to WT (FIG. 2A). The inventors next sought to determine whether the deletion of BCG antigenic genes influenced the survival of BCG in bovine macrophages. PBMC-derived bovine macrophages were infected with the mixture (1:1) of WT BCG and the ΔBCG TK mutant. The ΔBCG triple mutant survived in the macrophages as well as WT BCG (FIG. 2B). This confirms that the removal of antigens does not alter the in vitro or ex vivo growth characteristics of the ΔBCG TK strain.

Protective Efficacy of ΔBCG TK in Guinea Pigs

Figure 3A:
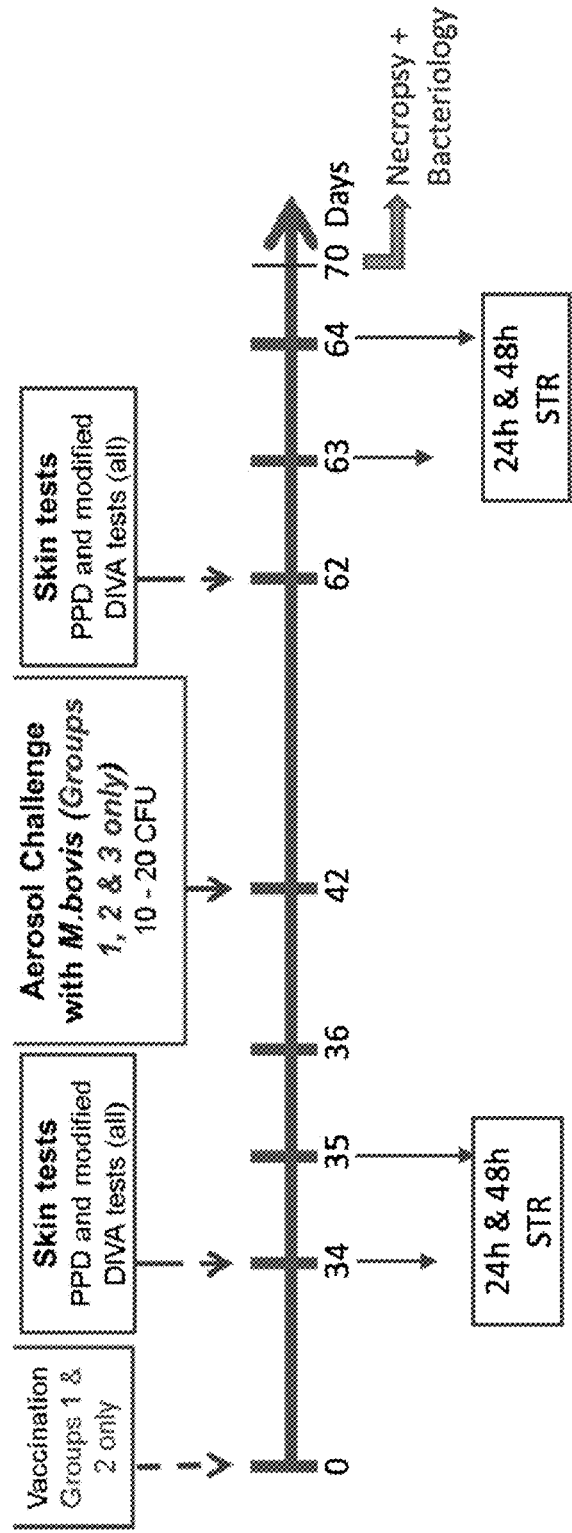

The aerosol-infection guinea pig model of human TB and bovine TB is commonly used as a screening tool to assess the protective efficacy of vaccines[48,49]. M. bovis challenge of guinea pigs has also proven useful to test the potency of vaccines against bovine TB[50]. Groups of Dunkin Hartley guinea pigs were thereby immunised subcutaneously on the nape with either ΔBCG TK (5×10⁴ cfu), or the wild-type BCG. Controls were unvaccinated. Protective immunity was assessed as the ability to reduce disease progression following challenge at 42 days post-vaccination (FIG. 3A) with virulent M. bovis (10-20 cfu by the aerosol route). Disease progression was assessed by weight loss, a sensitive indicator of TB in the guinea pig model. Disease burden was quantified by measurement of viable M. bovis in lungs and spleens.

Figure 3C:
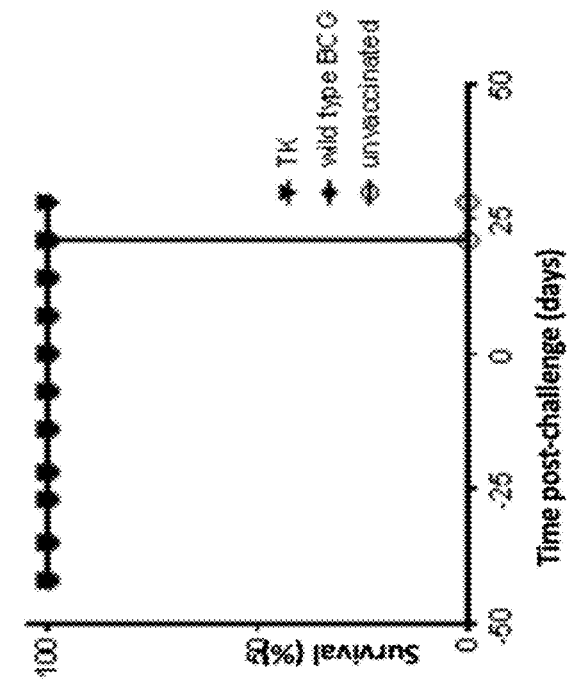
Figure 3B:
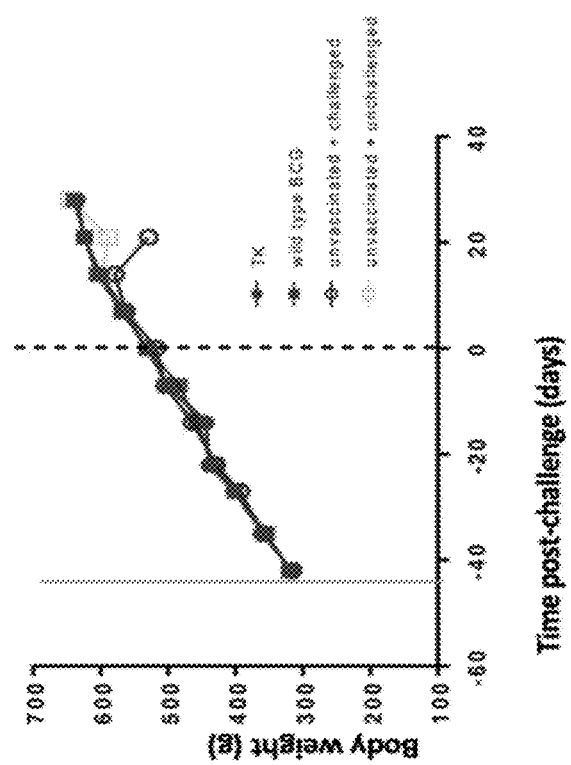

The uninfected controls together with all animals immunized with either ΔBCG TK or wild-type BCG gained weight normally after challenge (FIG. 3B). Indeed, there were no significant differences in weight gain between these two groups. After 21 days post-infection, however, non-immunized, infected animals exhibited a substantial weight loss and were euthanised at a pre-defined humane end-point; whilst the weight of vaccinated guinea pigs continued to increase steadily (FIG. 3B).

Although this study was not powered to measure survival, the notable difference between disease progression in vaccinated and unvaccinated animals permitted an analysis of survival (based upon time to humane end-point). The Kaplan Meier plot (FIG. 3C) shows that the vaccinated and challenged guinea pigs all survived until the end of the 4 week post-infection observation period, whereas all of the unvaccinated-challenged group had been euthanised by this time. In addition none of the animals vaccinated with either wild-type or ΔBCG strains showed any pathological signs of clinical disease thus confirming the protective efficacies of the strain.

Figure 4B:
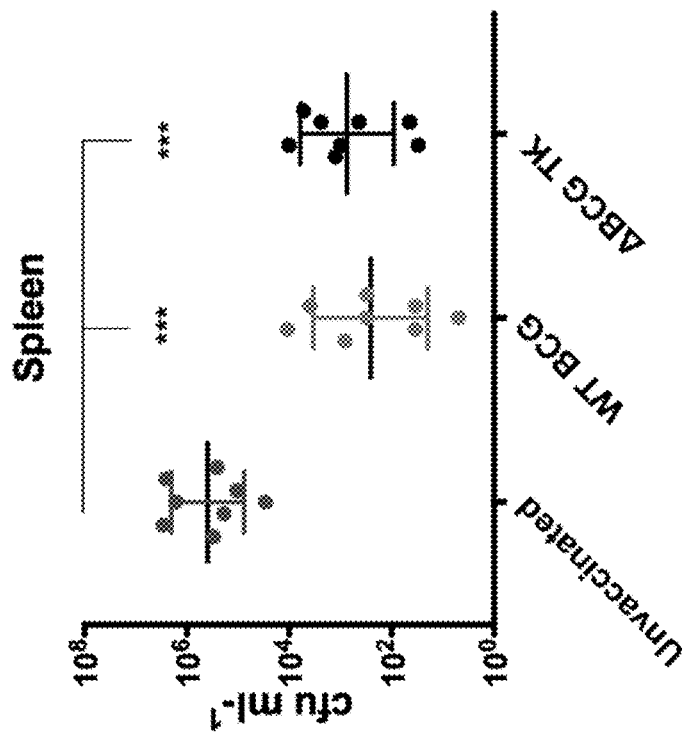
Figure 4A:
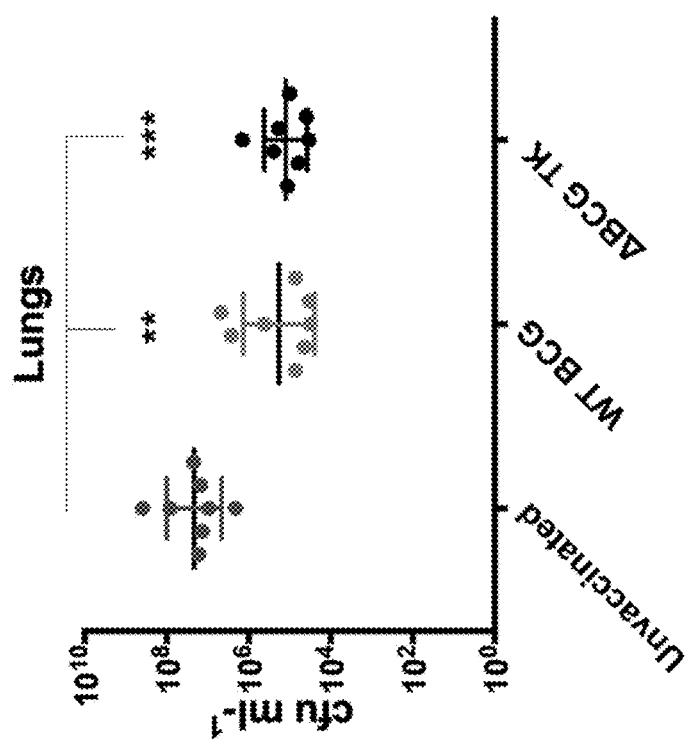

To assess the capacity of the recombinant vaccine ΔBCG TK to restrict the growth of M. bovis in tissues of challenged guinea pigs, the number of viable bacteria (colony forming units, cfu) in the lung, the primary site of infection, and spleen, a major site of bacterial dissemination was quantified at necropsy. The cfu data from lungs (FIG. 4A) and spleens (FIG. 4B) of challenged animals showed statistically significantly lower cfu burden in the lungs ($p<0.001$) and spleens ($p=0.0004$) of animals vaccinated with either vaccine compared to unvaccinated controls. The reductions in bacterial burden in either organ imparted by vaccination with wild-type BCG and ΔBCG TK was indistinguishable (FIGS. 4A-4B). Together with the data demonstrating prevention of disease progression, these data on reduced bacterial burden in lungs and spleens following vaccination with either vaccine demonstrates that the deletion of the target genes from ΔBCG TK has not reduced its protective efficacy.

Skin Test Immune Response Against Extended DIVA Antigens in Guinea Pigs

To test whether the antigens deleted from ΔBCG TK could induce skin test responses in M. bovis-infected guinea pigs, but not in vaccinated animals prior to infection, orthologs of the genes deleted from ΔBCG TK:esxS (BCG3043), MPB70 (BCG2897), MPB83 (BCG2895), espC were prepared as three different fusion proteins (ESAT-6-CFP-10, MPB70-MPB83, espC-esxS). These were tested alone, or in combination, as synthetic antigen cocktails.

Groups of guinea pigs were vaccinated as above with WT BCG, and ΔBCG TK, or left as unvaccinated controls, and subsequently challenged with M. bovis. Skin tests were performed on all animals post-vaccination to determine specificities, and also performed post-infection to determine sensitivities of the test reagents. The following antigen preparations were injected in a Latin Square arrangement 51 in the sites shown in FIG. 5A: PPD-B, fusion proteins of ESAT6-CFP10, MPB70 and MPB83, espC and esxS. A cocktail of all of these three fusion proteins (Triple antigen cocktail) was also tested.

Figures 5B, 5C:
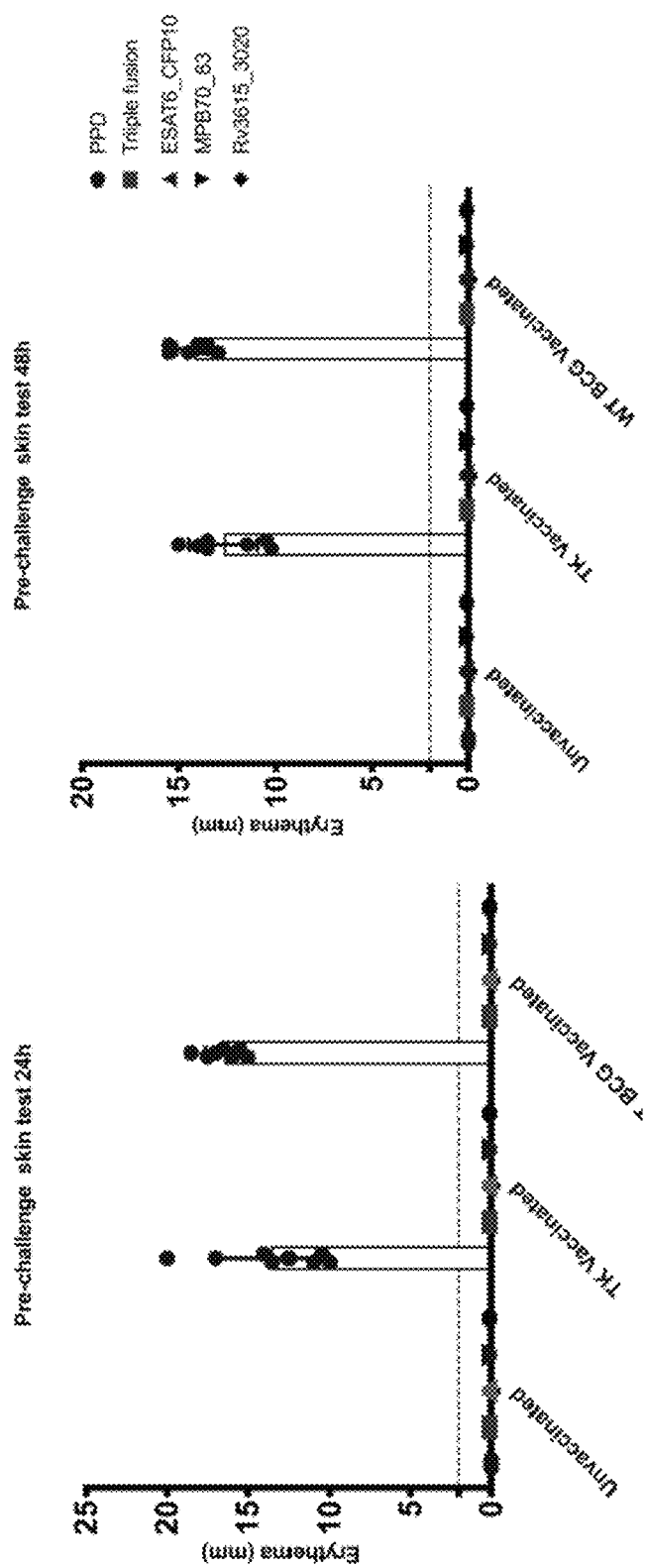
Figures 5D, 5E:
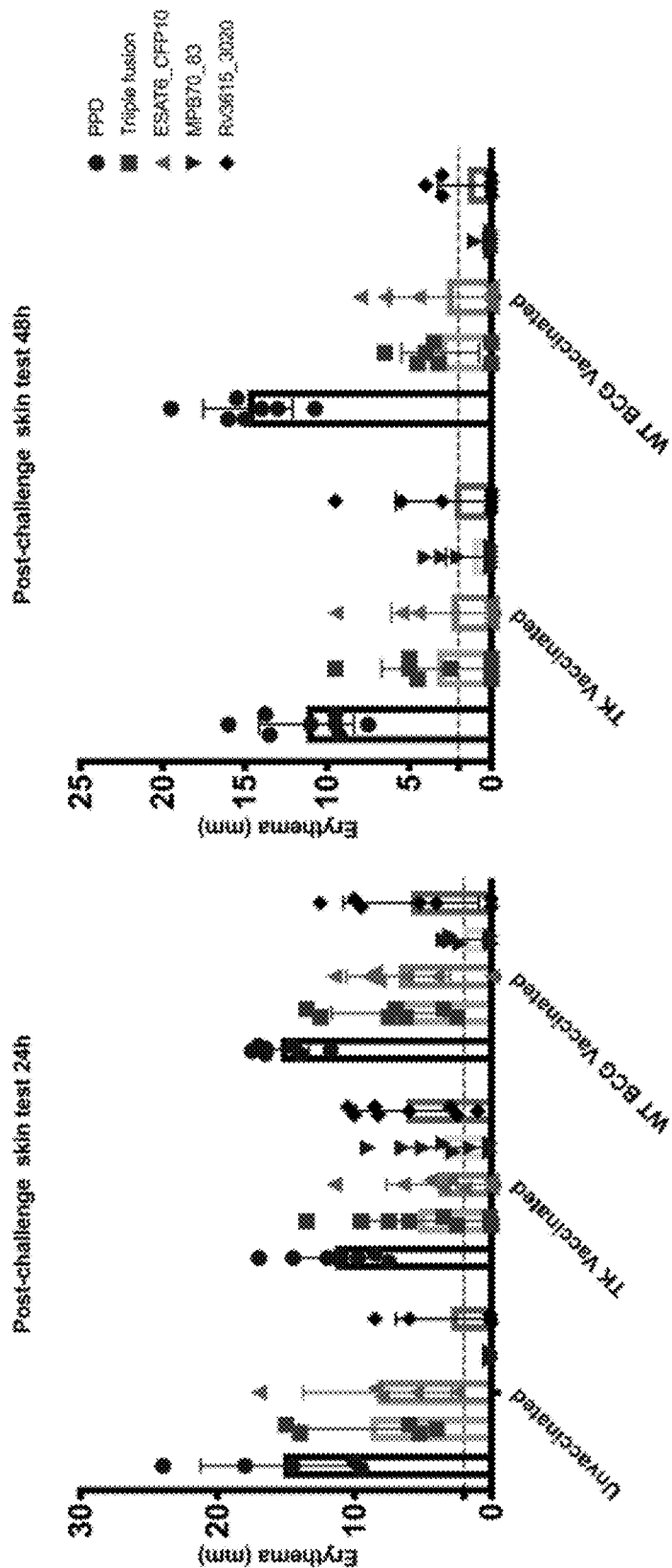

The groups of animals vaccinated with WT BCG or ΔBCG TK gave no skin reactions (measured at 24 h and 48 h post inoculation) pre-challenge to any of the DIVA antigen cocktails. As expected, injection of the standard PPD-B skin test reagent gave rise to reactions in both groups of vaccinated guinea pigs. Unvaccinated animals did not respond either to the DIVA cocktails or to PPD-B (FIG. 5B & FIG. 5C).

Following *M. bovis* challenge of these animals, both vaccine groups, as well as the unvaccinated control group, showed consistently positive responses to PPD-B with no significant difference in response between the vaccinated and unvaccinated animals (FIGS. 5D & 5E). Challenged animals also reacted to the DIVA antigen cocktails, particularly against the triple fusion protein cocktail injection (MPB70-MPB83, ESAT-6-CFP10 and espC-esxS) at the 24 h and 48 h measuring time point (FIGS. 5D & 5E). Unvaccinated animals showed response to PPD-B and the antigen cocktails only after *M. bovis* challenge. Only 24h skin-test reactions are shown for animals in this group as they had reached the humane end point. Importantly, the antigen cocktails distinguished between BCG and *M. bovis* exposure with skin test reactions occurring only in challenged animals irrespective of their immunization status (FIG. 12).

Skin Test Immune Response Against Extended DIVA Antigens in Naturally-Infected Cattle Skin responses induced by the triple fusion protein were also compared with those induced by a cocktail of ESAT-6/CFP10/Rv3615c (E6/C10/15c) in a small number of 6 naturally infected cattle. As FIG. 13 shows, the triple fusion induced stronger responses (Mean=−5.7 mm), compared to E6/C10/150 DIVA skin test reagent [Srinivasan S, Jones G, Veerasami M, Steinbach S, Holder T, Zewude A, Fromsa A, Ameni G, Easterling L, Bakker D, Juleff N. A defined antigen skin test for the diagnosis of bovine tuberculosis. Science advances. 2019 Jul. 1; 5(7): eaax4899] that generated a mean reaction size of 4 mm. Whilst reactions to the fusion protein were comparable to those of the SIT (i.e. bvobin PPD only, mean=6.5 mm), reactions to E6/C10/15c were comparable to SICCT responses (i.e. bovine PPD minus avian PPD reaction sizes, mean=3.1 mm). Thus, without being bound to any particular theory, the inventors believe that the results of this pilot experiment suggest that the performance of the status quo DIVA antigens ESAT-6, CFP-10 and espC can be enhanced by the addition of the additional ADIP proteins in the target species, cattle.

Discussion

This study is the first step in a novel strategy to engineer a diagnostically compatible BCG vaccine that has similar protective efficacy to the current commercially available BCG vaccines. The inventors constructed a ΔBCG TK strain that gave indistinguishable protection against BTB challenge as WT BCG. The inventors developed a compatible extended DIVA skin test that proved to be specific in not provoking skin reactions in vaccinated guinea pigs before challenge, but provoking reactions post-challenge. Adding additional antigens in a cocktail of 6 antigens, including the prototype DIVA antigens ESAT-6, CFP-10 and espC, alongside the triple antigen proteins (MPB70, MPB83 and esxS) led to significant increases in skin responses in all groups post-challenge whilst retaining the absence of skin test responses post-BCG vaccination prior to challenge. Similar tests in naturally-infected cattle demonstrated high sensitivity of the triple antigen protein skin test that was comparable to the standard SIT skin test and more sensitive to the state-of-the art DIVA skin test (Srinivasan S, Jones G, Veerasami M, Steinbach S, Holder T, Zewude A, Fromsa A, Ameni G, Easterling L, Bakker D, Juleff N. A defined antigen skin test for the diagnosis of bovine tuberculosis. Science advances. 2019 Jul. 1; 5(7): eaax4899.)

In summary, in this study the inventors demonstrate, for the first time, a new strategy for engineering a live bacterial vaccine that has been rationally-designed to optimize both protection and diagnostic compatibility. The DIVA cocktail described here is specific and is not affected by vaccination. The development of a combination of effective vaccine and skin test reagents could transform bovine TB control programmes worldwide. Similar strategies will also be of value for control of human TB, and perhaps other infectious diseases, because the guinea pig model described herein is as good a model for human TB as it is for bovine TB.

REFERENCES

1 Brown, C. Emerging zoonoses and pathogens of public health significance—an overview. Revue scientifique et technique-office international des epizooties 23, 435-442 (2004).
2 Perry, B. D. Investing in animal health research to alleviate poverty. (ILRI (aka ILCA and ILRAD), 2002).
3 Olea-Popelka, F. et al. Zoonotic tuberculosis in human beings caused by *Mycobacterium bovis*—a call for action. The Lancet Infectious Diseases 17, e21-e25 (2017).
4 Organization, W. H. Global Tuberculosis Report 2017. (World Health Organization, 2017).
5 Organization, W. H. Roadmap for zoonotic tuberculosis. (2017).
6 Pritchard, D. A century of bovine tuberculosis 1888-1988: conquest and controversy. Journal of comparative pathology 99, 357-399 (1988).
7 Borsuk, S., Newcombe, J., Mendum, T. A., Dellagostin, O. A. & McFadden, J. Identification of proteins from tuberculin purified protein derivative (PPD) by LC-MS/MS. Tuberculosis 89, 423-430 (2009).
8 Donnelly, C. A. et al. Impact of localized badger culling on tuberculosis incidence in British cattle. Nature 426, 834 (2003).
9 Calmette, A. (SAGE Publications, 1931).
10 Horwitz, M. A new TB vaccine. Immunologist 5, 15-20 (1997).
11 Zhu, B., Dockrell, H. M., Ottenhoff, T. H., Evans, T. G. & Zhang, Y. Tuberculosis vaccines: Opportunities and challenges. Respirology 23, 359-368 (2018).
12 Horwitz, M. A., Harth, G., Dillon, B. J. & Masleša-Galić, S. A novel live recombinant mycobacterial vaccine against bovine tuberculosis more potent than BCG. Vaccine 24, 1593-1600 (2006).
13 Larsen, M. H. et al. Efficacy and safety of live attenuated persistent and rapidly cleared *Mycobacterium tuberculosis* vaccine candidates in non-human primates. Vaccine 27, 4709-4717 (2009).
14 Martin, C. et al. The live *Mycobacterium tuberculosis* phoP mutant strain is more attenuated than BCG and confers protective immunity against tuberculosis in mice and guinea pigs. Vaccine 24, 3408-3419 (2006).
15 Sayes, F. et al. CD4+ T cells recognizing PE/PPE antigens directly or via cross reactivity are protective against pulmonary *Mycobacterium tuberculosis* infection. PLOS pathogens 12, e1005770 (2016).
16 Arbues, A. et al. Construction, characterization and preclinical evaluation of MTBVAC, the first live-attenuated *M. tuberculosis*-based vaccine to enter clinical trials. Vaccine 31, 4867-4873 (2013).

17 Kaufmann, S. H. et al. Progress in tuberculosis vaccine development and host-directed therapies-a state of the art review. The Lancet Respiratory Medicine 2, 301-320 (2014).

18 Sander, P. et al. Deletion of zmp1 improves *Mycobacterium bovis* BCG-mediated protection in a guinea pig model of tuberculosis. Vaccine 33, 1353-1359 (2015).

19 Suazo, F. M., Escalera, A. M. a. A. & Torres, R. M. G. A review of *M. bovis* BCG protection against TB in cattle and other animals species. Preventive veterinary medicine 58, 1-13 (2003).

20 Chambers, M. et al. Vaccination against tuberculosis in badgers and cattle: an overview of the challenges, developments and current research priorities in Great Britain. Veterinary Record 175, 90-96 (2014).

21 Wilson, G. J., Carter, S. P. & Delahay, R. J. Advances and prospects for management of TB transmission between badgers and cattle. Veterinary microbiology 151, 43-50 (2011).

22 Vordermeier, H. M. et al. Correlation of ESAT-6-specific gamma interferon production with pathology in cattle following *Mycobacterium bovis* BCG vaccination against experimental bovine tuberculosis. Infection and immunity 70, 3026-3032 (2002).

23 Chaparas, S. D., Maloney, C. J. & Hedrick, S. R. Specificity of tuberculins and antigens from various species of mycobacteria. American Review of Respiratory Disease 101, 74-83 (1970).

24 Mahairas, G. G., Sabo, P. J., Hickey, M. J., Singh, D. C. & Stover, C. K. Molecular analysis of genetic differences between *Mycobacterium bovis* BCG and virulent *M. bovis*. Journal of bacteriology 178, 1274-1282 (1996).

25 Fogan, L. PPD antigens and the diagnosis of mycobacterial diseases: a study of atypical mycobacterial disease in Oklahoma. Archives of internal medicine 124, 49-54 (1969).

26 Frothingham, R., Hills, H. G. & Wilson, K. H. Extensive DNA sequence conservation throughout the *Mycobacterium tuberculosis* complex. Journal of Clinical Microbiology 32, 1639-1643 (1994).

27 Imaeda, T. Deoxyribonucleic acid relatedness among selected strains of *Mycobacterium tuberculosis, Mycobacterium bovis, Mycobacterium bovis* BCG, *Mycobacterium microti*, and *Mycobacterium africanum*. International Journal of Systematic and Evolutionary Microbiology 35, 147-150 (1985).

28 Sester, M. et al. Interferon-y release assays for the diagnosis of active tuberculosis: a systematic review and meta-analysis. European Respiratory Journal 37, 100-111 (2011).

29 Monaghan, M., Doherty, M., Collins, J., Kazda, J. & Quinn, P. The tuberculin test. Veterinary microbiology 40, 111-124 (1994).

30 Vordermeier, M., Jones, G. J. & Whelan, A. O. DIVA reagents for bovine tuberculosis vaccines in cattle. Expert review of vaccines 10, 1083-1091 (2011).

31 Vordermeier, H. M., Jones, G. J., Buddle, B. M., Hewinson, R. G. & Villarreal-Ramos, B. Bovine tuberculosis in cattle: vaccines, DIVA tests, and host biomarker discovery. Annual review of animal biosciences 4, 87-109 (2016).

32 Whelan, A. O. et al. Development of a skin test for bovine tuberculosis for differentiating infected from vaccinated animals. Journal of clinical microbiology 48, 3176-3181 (2010).

33 Vordermeier, H. et al. Development of diagnostic reagents to differentiate between *Mycobacterium bovis* BCG vaccination and *M. bovis* infection in cattle. Clinical and diagnostic laboratory immunology 6, 675-682 (1999).

34 Vordermeier, H. M., Sidders, B., Stoker, N. G. & Ewer, K. (Google Patents, 2014).

35 Weir, R. E. et al. Persistence of the immune response induced by BCG vaccination. BMC infectious diseases 8, 9 (2008).

36 Villarreal-Ramos, B. et al. Development of a BCG challenge model for the testing of vaccine candidates against tuberculosis in cattle. Vaccine 32, 5645-5649 (2014).

37 DeJesus, M. A., Ambadipudi, C., Baker, R., Sassetti, C. & Ioerger, T. R. TRANSIT-a software tool for Himari TnSeq analysis. PLOS computational biology 11, e1004401 (2015).

38 Flower, D. R. & Perrie, Y. in Immunomic Discovery of Adjuvants and Candidate Subunit Vaccines (eds Darren R. Flower & Yvonne Perrie) 1-11 (Springer New York, 2013).

39 Vordermeier, M., Jones, G. J., Sampson, S. & Gordon, S. V. in Immunomic Discovery of Adjuvants and Candidate Subunit Vaccines (eds Darren R. Flower & Yvonne Perrie) 73-90 (Springer New York, 2013).

40 Mahmood, A. & Arora, A. G. Characterization of RD1 related secretory protein(s) from *Mycobacterium tuberculosis* H37Rv, (2015).

41 Harboe, M. & Nagai, S. MPB70, a unique antigen of *Mycobacterium bovis* BCG. American review of respiratory disease 129, 444-452 (1984).

42 Surujballi, O. et al. Sensitive diagnosis of bovine tuberculosis in a farmed cervid herd with use of an MPB70 protein fluorescence polarization assay. Canadian Journal of Veterinary Research 73, 161 (2009).

43 Harrington, N. P. Immune Responses of Deer (*Cervus elaphus*) to *Mycobacterium Bovis* Infection: Potential for Immunodiagnostics. (ProQuest, 2006).

44 Nayak, K. et al. Identification of novel *Mycobacterium tuberculosis* CD4 T-cell antigens via high throughput proteome screening. Tuberculosis 95, 275-287 (2015).

45 Mustafa, A. et al. Immunogenicity of *Mycobacterium tuberculosis* antigens in *Mycobacterium bovis* BCG-vaccinated and *M. bovis*-infected cattle. Infection and immunity 74, 4566-4572 (2006).

46 Bardarov, S. et al. Specialized transduction: an efficient method for generating marked and unmarked targeted gene disruptions in *Mycobacterium tuberculosis, M. bovis* BCG and *M. smegmatis*. Microbiology 148, 3007-3017 (2002).

47 Williams, K. J. et al. The *Mycobacterium tuberculosis*-oxidation genes echA5 and fadB3 are dispensable for growth in vitro and in vivo. Tuberculosis 91, 549-555 (2011).

48 Clark, S., Hall, Y. & Williams, A. Animal models of tuberculosis: guinea pigs. Cold Spring Harbor perspectives in medicine 5, a018572 (2015).

49 McMurray, D. N. in Tuberculosis 135-147 (American Society of Microbiology, 1994).

50 Clark, S. et al. Assessment of different formulations of oral *Mycobacterium bovis* Bacille Calmette-Guérin (BCG) vaccine in rodent models for immunogenicity and protection against aerosol challenge with *M. bovis*. Vaccine 26, 5791-5797 (2008).

51 Bradley, J. V. Complete counterbalancing of immediate sequential effects in a Latin square design. Journal of the American Statistical Association 53, 525-528 (1958).

52 Waters, W. R., Palmer, M. V., Buddle, B. M. & Vordermeier, H. M. Bovine tuberculosis vaccine research: historical perspectives and recent advances. Vaccine 30, 2611-2622 (2012).
53 Berggren, S. Field experiment with BCG vaccine in Malawi. British Veterinary Journal 137, 88-94 (1981).
54 Francis, J. Bovine Tuberculosis Including A Contras With Human Tuberculisis. (Staples Press Limited Cavendish Place, London W, 1947).
55 Rodrigues, L. C. & Smith, P. G. Tuberculosis in developing countries and methods for its control. Transactions of the Royal Society of Tropical Medicine and Hygiene 84, 739-744 (1990).
56 Veerasami, M. et al. Multi-antigen print immunoassay for seroepidemiological surveillance of bovine tuberculosis on Indian cattle farms. Veterinaria italiana 48, 253-267 (2012).
57 Clark, S., Hall, Y., Kelly, D., Hatch, G. & Williams, A. Survival of *Mycobacterium tuberculosis* during experimental aerosolization and implications for aerosol challenge models. Journal of applied microbiology 111, 350-359 (2011).
58 Hartings, J. M. & Roy, C. J. The automated bioaerosol exposure system: preclinical platform development and a respiratory dosimetry application with nonhuman primates. Journal of pharmacological and toxicological methods 49, 39-55 (2004).
59 Williams, A., Davies, A., Marsh, P. D., Chambers, M. A. & Hewinson, R. G. Comparison of the protective efficacy of bacille calmette-Guerin vaccination against aerosol challenge with *Mycobacterium tuberculosis* and *Mycobacterium bovis*. Clinical infectious diseases 30, S299-S301 (2000).
59 Mendum, T., Chandran, A. et al. Transposon libraries identify novel *Mycobacterium bovis* BCG genes involved in the dynamic interactions required for BCG to persist during in vivo passage in cattle. BMC Genomics (Accepted)

---

The invention claimed is:

1. An apparatus for tuberculosis vaccination and diagnosis, the apparatus comprising:
   (i) a vaccine comprising a mutant *Mycobacterium* cell, which has been modified compared to a corresponding wild-type cell, such that a plurality of genes, or products thereof, have been functionally deleted and/or inhibited, wherein the genes encode the native antigens esx-1 secretion-associated protein espA (espA), esat-6 like protein esxS (esxS), esx-1 secretion-associated protein espC (espC), major secreted immunogenic protein Mpb70 (MPB70), and cell surface lipoprotein Mpb83 (MPB83), or a homologue, paralogue, orthologue, functional fragment or variant thereof; and
   (ii) a composition configured to detect a *Mycobacterium* infection in a subject vaccinated with the vaccine of (i), the composition comprising the antigens of (i).

2. The apparatus of claim 1, wherein the *Mycobacterium* is selected from a group consisting of: *Mycobacterium tuberculosis, Mycobacterium bovis* Bacillus Calmette Guerin (BCG), *Mycobacterium microtti, Mycobacterium africanum, Mycobacterium smegmatis, Mycobacterium avium, Mycobacterium caprae* and *Mycobacterium vaccae*, optionally preferably wherein the mutant cell is a *Mycobacterium bovis* cell, or a *Mycobacterium tuberculosis* cell, more optionally wherein the mutant *Mycobacterium* cell is a mutant *Bacillus Calmette-Guérin* (BCG) *Mycobacterium bovis* cell.

3. The apparatus according to claim 1, wherein the mutant *Mycobacterium* cell expresses a protein that increases its immunogenicity in a host, and wherein the protein is a mutant *Escherichia coli* heat-labile toxin LT, or a mutant A subunit thereof.

4. The apparatus according to claim 1, wherein the antigens further comprise ESAT6 and/or CFP-10.

5. The apparatus according to claim 4, wherein
   (i) espA comprises or consists of an amino acid sequence substantially as set out in SEQ ID NO: 9, or a functional fragment or variant thereof, or is encoded by a nucleic acid sequence comprising or consisting of a nucleotide sequence substantially as set out in SEQ ID NO: 10, or a fragment or variant thereof;
   (ii) esxS comprises or consists of an amino acid sequence substantially as set out in SEQ ID NO: 1, or a functional fragment or variant thereof, or is encoded by a nucleic acid sequence comprising or consisting of a nucleotide sequence substantially as set out in SEQ ID NO: 2, or a fragment or variant thereof;
   (iii) espC comprises or consists of an amino acid sequence substantially as set out in SEQ ID NO: 7, or a functional fragment or variant thereof, or is encoded by a nucleic acid sequence comprising or consisting of a nucleotide sequence substantially as set out in SEQ ID NO: 8, or a fragment or variant thereof;
   (iv) MPB70 comprises or consists of an amino acid sequence substantially as set out in SEQ ID NO: 3, or a functional fragment or variant thereof, or is encoded by a nucleic acid sequence comprising or consisting of a nucleotide sequence substantially as set out in SEQ ID NO: 4, or a fragment or variant thereof; and/or
   (v) MPB83 comprises or consists of an amino acid sequence substantially as set out in SEQ ID NO: 5, or a functional fragment or variant thereof, or is encoded by a nucleic acid sequence comprising or consisting of a nucleotide sequence substantially as set out in SEQ ID No: 6, or a fragment or variant thereof; and/or
   (vi) wherein ESAT6 comprises or consists of an amino acid sequence substantially as set out in SEQ ID NO: 11, or a functional fragment or variant thereof, or is encoded by a nucleic acid sequence comprising or consisting of a nucleotide sequence substantially as set out in SEQ ID NO: 12, or a fragment or variant thereof; and/or
   (vii) wherein CFP10 comprises or consists of an amino acid sequence substantially as set out in SEQ ID NO:

13, or a functional fragment or variant thereof, or is encoded by a nucleic acid sequence comprising or consisting of a nucleotide sequence substantially as set out in SEQ ID NO: 14, or a fragment or variant thereof.

6. A mutant *Mycobacterium* cell, which has been modified compared to a corresponding wild-type cell, such that a plurality of genes, or products thereof, have been functionally deleted and/or inhibited, wherein the genes encode the antigens esx-1 secretion-associated protein espA (espA), esat-6 like protein esxS (esxS); esx-1 secretion-associated protein espC (espC); major secreted immunogenic protein Mpb70 (MPB70); and cell surface lipoprotein Mpb83 (MPB83) or a homologue, paralogue, orthologue, functional fragment or variant thereof.

7. The mutant *Mycobacterium* cell according to claim 6, wherein the *Mycobacterium* is selected from a group consisting of: *Mycobacterium tuberculosis, Mycobacterium bovis Bacillus Calmette Guerin* (BCG), *Mycobacterium microtti, Mycobacterium africanum, Mycobacterium smegmatis, Mycobacterium avium, Mycobacterium caprae* and *Mycobacterium vaccae*,
  optionally wherein the mutant cell is a *Mycobacterium bovis* cell, or a *Mycobacterium tuberculosis* cell, more optionally wherein the mutant *Mycobacterium* cell is a mutant *Bacillus Calmette-Guérin* (BCG) *Mycobacterium bovis* cell.

8. The mutant *Mycobacterium* cell according to claim 6, wherein the mutant *Mycobacterium* cell expresses a protein that increases its immunogenicity in a host, optionally wherein the protein is a mutant *Escherichia coli* heat-labile toxin LT, or a mutant A subunit thereof.

9. The mutant *Mycobacterium* cell according to claim 6, wherein the antigens further comprise ESAT6 and/or CFP-10.

10. The mutant *Mycobacterium* cell according to claim 9, wherein
  (i) espA comprises or consists of an amino acid sequence substantially as set out in SEQ ID NO: 9, or a functional fragment or variant thereof, or is encoded by a nucleic acid sequence comprising or consisting of a nucleotide sequence substantially as set out in SEQ ID NO: 10, or a fragment or variant thereof;
  (ii) esxS comprises or consists of an amino acid sequence substantially as set out in SEQ ID NO: 1, or a functional fragment or variant thereof, or is encoded by a nucleic acid sequence comprising or consisting of a nucleotide sequence substantially as set out in SEQ ID NO: 2, or a fragment or variant thereof;
  (iii) espC comprises or consists of an amino acid sequence substantially as set out in SEQ ID NO: 7, or a functional fragment or variant thereof, or is encoded by a nucleic acid sequence comprising or consisting of a nucleotide sequence substantially as set out in SEQ ID NO: 8, or a fragment or variant thereof;
  (iv) MPB70 comprises or consists of an amino acid sequence substantially as set out in SEQ ID NO: 3, or a functional fragment or variant thereof, or is encoded by a nucleic acid sequence comprising or consisting of a nucleotide sequence substantially as set out in SEQ ID NO: 4, or a fragment or variant thereof; and/or
  (v) MPB83 comprises or consists of an amino acid sequence substantially as set out in SEQ ID NO: 5, or a functional fragment or variant thereof, or is encoded by a nucleic acid sequence comprising or consisting of a nucleotide sequence substantially as set out in SEQ ID No: 6, or a fragment or variant thereof; and/or
  (vi) wherein ESAT6 comprises or consists of an amino acid sequence substantially as set out in SEQ ID NO: 11, or a functional fragment or variant thereof, or is encoded by a nucleic acid sequence comprising or consisting of a nucleotide sequence substantially as set out in SEQ ID NO: 12, or a fragment or variant thereof; and/or
  (vii) wherein CFP10 comprises or consists of an amino acid sequence substantially as set out in SEQ ID NO: 13, or a functional fragment or variant thereof, or is encoded by a nucleic acid sequence comprising or consisting of a nucleotide sequence substantially as set out in SEQ ID NO: 14, or a fragment or variant thereof.

* * * * *

SEQUENCE LISTING

<160> NUMBER OF SEQ ID NOS: 40

<210> SEQ ID NO 1
<211> LENGTH: 97
<212> TYPE: PRT
<213> ORGANISM: Mycobacterium bovis

<400> SEQUENCE: 1

```
Met Ser Leu Leu Asp Ala His Ile Pro Gln Leu Ile Ala Ser His Thr
1               5                   10                  15

Ala Phe Ala Ala Lys Ala Gly Leu Met Arg His Thr Ile Gly Gln Ala
            20                  25                  30

Glu Gln Gln Ala Met Ser Ala Gln Ala Phe His Gln Gly Glu Ser Ala
        35                  40                  45

Ala Ala Phe Gln Gly Ala His Ala Arg Phe Val Ala Ala Ala Lys
    50                  55                  60

Val Asn Thr Leu Leu Asp Ile Ala Gln Ala Asn Leu Gly Glu Ala Ala
65                  70                  75                  80

Gly Thr Tyr Val Ala Ala Asp Ala Ala Ala Ser Ser Tyr Thr Gly
                85                  90                  95

Phe
```

<210> SEQ ID NO 2
<211> LENGTH: 294
<212> TYPE: DNA
<213> ORGANISM: Mycobacterium bovis

<400> SEQUENCE: 2

```
atgagtttgt tggatgccca tattccgcag ttgatcgctt cgcatacggc gtttgccgct    60 aaggcgggt tgatgcggca tacgatcggt caggccgagc agcaggcgat gtcggcgcag   120
gcgtttcatc agggagagtc cgcggcggcg tttcagggtg cgcatgcccg gtttgtggcc   180
gcggccgcca aggtcaatac cttgctggat atcgcgcaag ccaatttggg tgaggccgcg   240
ggcacgtatg tggccgccga tgccgccgcc gcgtccagct acaccgggtt ttaa          294
```

<210> SEQ ID NO 3
<211> LENGTH: 193
<212> TYPE: PRT
<213> ORGANISM: Mycobacterium bovis

<400> SEQUENCE: 3

```
Met Lys Val Lys Asn Thr Ile Ala Ala Thr Ser Phe Ala Ala Ala Gly
1               5                   10                  15
Leu Ala Ala Leu Ala Val Ala Val Ser Pro Ala Ala Ala Gly Asp
                20                  25                  30
Leu Val Gly Pro Gly Cys Ala Glu Tyr Ala Ala Ala Asn Pro Thr Gly
                35                  40                  45
Pro Ala Ser Val Gln Gly Met Ser Gln Asp Pro Val Ala Val Ala Ala
            50                  55                  60
Ser Asn Asn Pro Glu Leu Thr Thr Leu Thr Ala Ala Leu Ser Gly Gln
65                  70                  75                  80
Leu Asn Pro Gln Val Asn Leu Val Asp Thr Leu Asn Ser Gly Gln Tyr
                85                  90                  95
Thr Val Phe Ala Pro Thr Asn Ala Ala Phe Ser Lys Leu Pro Ala Ser
                100                 105                 110
Thr Ile Asp Glu Leu Lys Thr Asn Ser Ser Leu Leu Thr Ser Ile Leu
            115                 120                 125
Thr Tyr His Val Val Ala Gly Gln Thr Ser Pro Ala Asn Val Val Gly
            130                 135                 140
Thr Arg Gln Thr Leu Gln Gly Ala Ser Val Thr Val Thr Gly Gln Gly
145                 150                 155                 160
Asn Ser Leu Lys Val Gly Asn Ala Asp Val Val Cys Gly Gly Val Ser
                165                 170                 175
Thr Ala Asn Ala Thr Val Tyr Met Ile Asp Ser Val Leu Met Pro Pro
            180                 185                 190
Ala
```

```
<210> SEQ ID NO 4
<211> LENGTH: 582
<212> TYPE: DNA
<213> ORGANISM: Mycobacterium bovis

<400> SEQUENCE: 4
atgaaggtaa agaacacaat tgcggcaacc agtttcgcgg cggccggcct ggcggctctg    60
gcggtggctg tctcaccgcc ggcggccgca ggcgatctgg tgggcccggg ctgcgcggaa   120
tacgcggcag ccaatcccac tgggccggcc tcggtgcagg gaatgtcgca ggacccggtc   180
gcggtggcgg cctcgaacaa tccggagttg acaacgctga cggctgcact gtcgggccag   240
ctcaatccgc aagtaaacct ggtggacacc ctcaacagcg gtcagtacac ggtgttcgca   300
ccgaccaacg cggcatttag caagctgccg gcatccacga tcgacgagct caagaccaat   360
tcgtcactgc tgaccagcat cctgacctac cacgtagtgg ccggccaaac cagcccggcc   420
aacgtcgtcg gcacccgtca gaccctccag ggcgccagcg tgacggtgac cggtcagggt   480
aacagcctca aggtcggtaa cgccgacgtc gtctgtggtg gggtgtctac cgccaacgcg   540
acggtgtaca tgattgacag cgtgctaatg cctccggcgt aa                      582
```

```
<210> SEQ ID NO 5
<211> LENGTH: 220
<212> TYPE: PRT
<213> ORGANISM: Mycobacterium bovis

<400> SEQUENCE: 5

Met Ile Asn Val Gln Ala Lys Pro Ala Ala Ala Ala Ser Leu Ala Ala
1               5                   10                  15
```

Ile Ala Ile Ala Phe Leu Ala Gly Cys Ser Ser Thr Lys Pro Val Ser
            20                  25                  30

Gln Asp Thr Ser Pro Lys Pro Ala Thr Ser Pro Ala Ala Pro Val Thr
        35                  40                  45

Thr Ala Ala Met Ala Asp Pro Ala Ala Asp Leu Ile Gly Arg Gly Cys
    50                  55                  60

Ala Gln Tyr Ala Ala Gln Asn Pro Thr Gly Pro Gly Ser Val Ala Gly
65                  70                  75                  80

Met Ala Gln Asp Pro Val Ala Thr Ala Ala Ser Asn Asn Pro Met Leu
                85                  90                  95

Ser Thr Leu Thr Ser Ala Leu Ser Gly Lys Leu Asn Pro Asp Val Asn
            100                 105                 110

Leu Val Asp Thr Leu Asn Gly Gly Glu Tyr Thr Val Phe Ala Pro Thr
        115                 120                 125

Asn Ala Ala Phe Asp Lys Leu Pro Ala Ala Thr Ile Asp Gln Leu Lys
    130                 135                 140

Thr Asp Ala Lys Leu Leu Ser Ser Ile Leu Thr Tyr His Val Ile Ala
145                 150                 155                 160

Gly Gln Ala Ser Pro Ser Arg Ile Asp Gly Thr His Gln Thr Leu Gln
                165                 170                 175

Gly Ala Asp Leu Thr Val Ile Gly Ala Arg Asp Asp Leu Met Val Asn
            180                 185                 190

Asn Ala Gly Leu Val Cys Gly Gly Val His Thr Ala Asn Ala Thr Val
        195                 200                 205

Tyr Met Ile Asp Thr Val Leu Met Pro Pro Ala Gln
    210                 215                 220

<210> SEQ ID NO 6
<211> LENGTH: 663
<212> TYPE: DNA
<213> ORGANISM: Mycobacterium bovis

<400> SEQUENCE: 6
atgatcaacg ttcaggccaa accggccgca gcagcgagcc tcgcagccat cgcgattgcg      60
ttcttagcgg gttgttcgag caccaaaccc gtgtcgcaag acaccagccc gaaaccggcg     120
accagcccgg cggcgcccgt taccacggcg gcaatggctg accccgcagc ggacctgatt     180
ggtcgtgggt gcgcgcaata cgcggcgcaa atcccaccg tcccggatc ggtggccgga      240 atggcgcaag acccggtcgc taccgcggct ccaacaacc cgatgctcag taccctgacc     300
tcggctctgt cgggcaagct gaacccggat gtgaatctgg tcgacaccct caacggcggc     360
gagtacaccg ttttcgcccc caccaacgcc gcattcgaca agctgccggc ggccactatc     420
gatcaactca agactgacgc caagctgctc agcagcatcc tgacctacca cgtgatagcc     480
ggccaggcga gtccgagcag gatcgacggc acccatcaga ccctgcaagg tgccgacctg     540
acggtgatag cgcccgcga cgacctcatg gtcaacaacg ccggtttggt atgtggcgga     600
gttcacaccg ccaacgcgac ggtgtacatg atcgatacgg tgctgatgcc cccggcacag     660
taa                                                                   663

<210> SEQ ID NO 7
<211> LENGTH: 103
<212> TYPE: PRT
<213> ORGANISM: Mycobacterium bovis

<400> SEQUENCE: 7

```
Met Thr Glu Asn Leu Thr Val Gln Pro Glu Arg Leu Gly Val Leu Ala
1               5                   10                  15

Ser His His Asp Asn Ala Ala Val Asp Ala Ser Ser Gly Val Glu Ala
            20                  25                  30

Ala Ala Gly Leu Gly Glu Ser Val Ala Ile Thr His Gly Pro Tyr Cys
        35                  40                  45

Ser Gln Phe Asn Asp Thr Leu Asn Val Tyr Leu Thr Ala His Asn Ala
    50                  55                  60

Leu Gly Ser Ser Leu His Thr Ala Gly Val Asp Leu Ala Lys Ser Leu
65                  70                  75                  80

Arg Ile Ala Ala Lys Ile Tyr Ser Glu Ala Asp Glu Ala Trp Arg Lys
                85                  90                  95

Ala Ile Asp Gly Leu Phe Thr
            100
```

<210> SEQ ID NO 8
<211> LENGTH: 312
<212> TYPE: DNA
<213> ORGANISM: Mycobacterium bovis

<400> SEQUENCE: 8

```
atgacggaaa acttgaccgt ccagcccgag cgtctcggtg tactggcgtc gcaccatgac      60
aacgcggcgg tcgatgcctc ctcgggcgtc gaagctgccg ctggcctagg cgaatctgtg     120
gcgatcactc acggtccgta ctgctcacag ttcaacgaca cgttaaatgt gtacttgact     180
gcccacaatg ccctgggctc gtccttgcat acggccggtg tcgatctcgc caaaagtctt     240
cgaattgcgg cgaagatata tagcgaggcc gacgaagcgt ggcgcaaggc tatcgacggg     300
ttgtttacct ga                                                        312
```

<210> SEQ ID NO 9
<211> LENGTH: 392
<212> TYPE: PRT
<213> ORGANISM: Mycobacterium bovis

<400> SEQUENCE: 9

```
Met Ser Arg Ala Phe Ile Ile Asp Pro Thr Ile Ser Ala Ile Asp Gly
1               5                   10                  15

Leu Tyr Asp Leu Leu Gly Ile Gly Ile Pro Asn Gln Gly Gly Ile Leu
            20                  25                  30

Tyr Ser Ser Leu Glu Tyr Phe Glu Lys Ala Leu Glu Glu Leu Ala Ala
        35                  40                  45

Ala Phe Pro Gly Asp Gly Trp Leu Gly Ser Ala Ala Asp Lys Tyr Ala
    50                  55                  60

Gly Lys Asn Arg Asn His Val Asn Phe Phe Gln Glu Leu Ala Asp Leu
65                  70                  75                  80

Asp Arg Gln Leu Ile Ser Leu Ile His Asp Gln Ala Asn Ala Val Gln
                85                  90                  95

Thr Thr Arg Asp Ile Leu Glu Gly Ala Lys Lys Gly Leu Glu Phe Val
            100                 105                 110

Arg Pro Val Ala Val Asp Leu Thr Tyr Ile Pro Val Val Gly His Ala
        115                 120                 125

Leu Ser Ala Ala Phe Gln Ala Pro Phe Cys Ala Gly Ala Met Ala Val
    130                 135                 140

Val Gly Gly Ala Leu Ala Tyr Leu Ala Val Lys Thr Leu Ile Asn Ala
145                 150                 155                 160
```

```
Thr Gln Leu Leu Lys Leu Leu Ala Lys Leu Ala Glu Leu Val Ala Ala
                165                 170                 175

Ala Ile Ala Asp Ile Ile Ser Asp Val Ala Asp Ile Ile Lys Gly Ile
            180                 185                 190

Leu Gly Glu Val Trp Glu Phe Ile Thr Asn Ala Leu Asn Gly Leu Lys
        195                 200                 205

Glu Leu Trp Asp Lys Leu Thr Gly Trp Val Thr Gly Leu Phe Ser Arg
    210                 215                 220

Gly Trp Ser Asn Leu Glu Ser Phe Phe Ala Gly Val Pro Gly Leu Thr
225                 230                 235                 240

Gly Ala Thr Ser Gly Leu Ser Gln Val Thr Gly Leu Phe Gly Ala Ala
                245                 250                 255

Gly Leu Ser Ala Ser Ser Gly Leu Ala His Ala Asp Ser Leu Ala Ser
            260                 265                 270

Ser Ala Ser Leu Pro Ala Leu Ala Gly Ile Gly Gly Gly Ser Gly Phe
        275                 280                 285

Gly Gly Leu Pro Ser Leu Ala Gln Val His Ala Ala Ser Thr Arg Gln
    290                 295                 300

Ala Leu Arg Pro Arg Ala Asp Gly Pro Val Gly Ala Ala Ala Glu Gln
305                 310                 315                 320

Val Gly Gly Gln Ser Gln Leu Val Ser Ala Gln Gly Ser Gln Gly Met
                325                 330                 335

Gly Gly Pro Val Gly Met Gly Gly Met His Pro Ser Ser Gly Ala Ser
            340                 345                 350

Lys Gly Thr Thr Thr Lys Lys Tyr Ser Glu Gly Ala Ala Ala Gly Thr
        355                 360                 365

Glu Asp Ala Glu Arg Ala Pro Val Glu Ala Asp Ala Gly Gly Gly Gln
    370                 375                 380

Lys Val Leu Val Arg Asn Val Val
385                 390
```

<210> SEQ ID NO 10
<211> LENGTH: 1179
<212> TYPE: DNA
<213> ORGANISM: Mycobacterium bovis

<400> SEQUENCE: 10

```
atgagcagag cgttcatcat cgatccaacg atcagtgcca ttgacggctt gtacgacctt     60
ctggggattg gaatacccaa ccaaggggggt atcctttact cctcactaga gtacttcgaa    120
aaagccctgg aggagctggc agcagcgttt ccgggtgatg gctggttagg ttcggccgcg    180
gacaaatacg ccggcaaaaa ccgcaaccac gtgaattttt tccaggaact ggcagacctc    240
gatcgtcagc tcatcagcct gatccacgac caggccaacg cggtccagac gacccgcgac    300
atcctggagg gcgccaagaa aggtctcgag ttcgtgcgcc cggtggctgt ggacctgacc    360
tacatcccgg tcgtcgggca cgccctatcg gccgccttcc aggcgccgtt ttgcgcgggc    420
gcgatggccg tagtgggcgg cgcgcttgcc tacttggtcg tgaaaacgct gatcaacgcg    480
actcaactcc tcaaattgct tgccaaattg gcggagttgg tcgcggccgc cattgcggac    540
atcatttcgg atgtggcgga catcatcaag ggcaccctcg gagaagtgtg ggagttcatc    600
acaaacgcgc tcaacggcct gaaagagctt tgggacaagc tcacggggtg ggtgaccgga    660
ctgttctctc gagggtggtc gaacctggag tccttctttg cgggcgtccc cggcttgacc    720
ggcgcgacca gcggcttgtc gcaagtgact ggcttgttcg gtgcggccgg tctgtccgca    780
```

```
tcgtcgggct tggctcacgc ggatagcctg gcgagctcag ccagcttgcc cgccctggcc    840
ggcattgggg gcgggtccgg ttttgggggc ttgccgagcc tggctcaggt ccatgccgcc    900
tcaactcggc aggcgctacg gccccgagct gatggcccgg tcggcgccgc tgccgagcag    960
gtcggcgggc agtcgcagct ggtctccgcg cagggttccc aaggtatggg cggacccgta   1020
ggcatgggcg gcatgcaccc ctcttcgggg gcgtcgaaag ggacgacgac gaagaagtac   1080
tcggaaggcg cggcggcggg cactgaagac gccgagcgcg cgccagtcga agctgacgcg   1140
ggcggtgggc aaaaggtgct ggtacgaaac gtcgtctaa                          1179

<210> SEQ ID NO 11
<211> LENGTH: 95
<212> TYPE: PRT
<213> ORGANISM: Mycobacterium tuberculosis

<400> SEQUENCE: 11

Met Thr Glu Gln Gln Trp Asn Phe Ala Gly Ile Glu Ala Ala Ala Ser
1               5                   10                  15

Ala Ile Gln Gly Asn Val Thr Ser Ile His Ser Leu Leu Asp Glu Gly
            20                  25                  30

Lys Gln Ser Leu Thr Lys Leu Ala Ala Ala Trp Gly Gly Ser Gly Ser
        35                  40                  45

Glu Ala Tyr Gln Gly Val Gln Gln Lys Trp Asp Ala Thr Ala Thr Glu
    50                  55                  60

Leu Asn Asn Ala Leu Gln Asn Leu Ala Arg Thr Ile Ser Glu Ala Gly
65                  70                  75                  80

Gln Ala Met Ala Ser Thr Glu Gly Asn Val Thr Gly Met Phe Ala
                85                  90                  95

<210> SEQ ID NO 12
<211> LENGTH: 288
<212> TYPE: DNA
<213> ORGANISM: Mycobacterium tuberculosis

<400> SEQUENCE: 12
atgacagagc agcagtggaa tttcgcgggt atcgaggccg cggcaagcgc aatccaggga     60
aatgtcacgt ccattcattc cctccttgac gaggggaagc agtccctgac caagctcgca    120
gcggcctggg gcggtagcgg ttcggaggcg taccagggtg tccagcaaaa atgggacgcc    180
acggctaccg agctgaacaa cgcgctgcag aacctggcgc ggacgatcag cgaagccggt    240
caggcaatgg cttcgaccga aggcaacgtc actgggatgt tcgcatag                 288

<210> SEQ ID NO 13
<211> LENGTH: 100
<212> TYPE: PRT
<213> ORGANISM: Mycobacterium tuberculosis

<400> SEQUENCE: 13

Met Ala Glu Met Lys Thr Asp Ala Ala Thr Leu Ala Gln Glu Ala Gly
1               5                   10                  15

Asn Phe Glu Arg Ile Ser Gly Asp Leu Lys Thr Gln Ile Asp Gln Val
            20                  25                  30

Glu Ser Thr Ala Gly Ser Leu Gln Gly Gln Trp Arg Gly Ala Ala Gly
        35                  40                  45

Thr Ala Ala Gln Ala Ala Val Val Arg Phe Gln Glu Ala Ala Asn Lys
    50                  55                  60

Gln Lys Gln Glu Leu Asp Glu Ile Ser Thr Asn Ile Arg Gln Ala Gly
```

```
                65                  70                  75                  80
Val Gln Tyr Ser Arg Ala Asp Glu Gln Gln Gln Ala Leu Ser Ser
                    85                  90                  95

Gln Met Gly Phe
            100

<210> SEQ ID NO 14
<211> LENGTH: 303
<212> TYPE: DNA
<213> ORGANISM: Mycobacterium tuberculosis

<400> SEQUENCE: 14
atggcagaga tgaagaccga tgccgctacc ctcgcgcagg aggcaggtaa tttcgagcgg      60
atctccggcg acctgaaaac ccagatcgac caggtggagt cgacggcagg ttcgttgcag     120
ggccagtggc gcggcgcggc ggggacggcc gcccaggccg cggtggtgcg cttccaagaa     180
gcagccaata gcagaagca ggaactcgac gagatctcga cgaatattcg tcaggccggc      240
gtccaatact cgagggccga cgaggagcag cagcaggcgc tgtcctcgca aatgggcttc     300
tga                                                                    303

<210> SEQ ID NO 15
<211> LENGTH: 240
<212> TYPE: PRT
<213> ORGANISM: Escherichia coli

<400> SEQUENCE: 15

Asn Gly Asp Arg Leu Tyr Arg Ala Asp Ser Arg Pro Pro Asp Glu Ile
1               5                   10                  15

Lys Arg Ser Gly Gly Leu Met Pro Arg Gly His Asn Glu Tyr Phe Asp
                20                  25                  30

Arg Gly Thr Gln Met Asn Ile Asn Leu Tyr Asp His Ala Arg Gly Thr
            35                  40                  45

Gln Thr Gly Phe Val Arg Tyr Asp Asp Gly Tyr Val Ser Thr Ser Leu
        50                  55                  60

Ser Leu Arg Ser Ala His Leu Ala Gly Gln Ser Ile Leu Ser Gly Tyr
65                  70                  75                  80

Ser Thr Tyr Tyr Ile Tyr Val Ile Ala Thr Ala Pro Asn Met Phe Asn
                85                  90                  95

Val Asn Asp Val Leu Gly Val Tyr Ser Pro His Pro Tyr Glu Gln Glu
                100                 105                 110

Val Ser Ala Leu Gly Gly Ile Pro Tyr Ser Gln Ile Tyr Gly Trp Tyr
            115                 120                 125

Arg Val Asn Phe Gly Val Ile Asp Glu Arg Leu His Arg Asn Arg Glu
        130                 135                 140

Tyr Arg Asp Arg Tyr Tyr Arg Asn Leu Asn Ile Ala Pro Ala Glu Asp
145                 150                 155                 160

Gly Tyr Arg Leu Ala Gly Phe Pro Pro Asp His Gln Ala Trp Arg Glu
                165                 170                 175

Glu Pro Trp Ile His His Ala Pro Gln Gly Cys Gly Asn Ser Ser Arg
            180                 185                 190

Thr Ile Thr Gly Asp Thr Cys Asn Glu Glu Thr Gln Asn Leu Ser Thr
        195                 200                 205

Ile Tyr Leu Arg Glu Tyr Gln Ser Lys Val Lys Arg Gln Ile Phe Ser
    210                 215                 220

Asp Tyr Gln Ser Glu Val Asp Ile Tyr Asn Arg Ile Arg Asp Glu Leu
```

-continued

```
<210> SEQ ID NO 16
<211> LENGTH: 32
<212> TYPE: DNA
<213> ORGANISM: Artificial Sequence
<220> FEATURE:
<223> OTHER INFORMATION: Zeo_casset_F primer

<400> SEQUENCE: 16
gaactccaat tgatggccaa gttgaccagt gc                                  32

<210> SEQ ID NO 17
<211> LENGTH: 33
<212> TYPE: DNA
<213> ORGANISM: Artificial Sequence
<220> FEATURE:
<223> OTHER INFORMATION: Zeo_casset_R primer

<400> SEQUENCE: 17
gaactccata tgtcagtcct gctcctcggc cac                                 33

<210> SEQ ID NO 18
<211> LENGTH: 31
<212> TYPE: DNA
<213> ORGANISM: Artificial Sequence
<220> FEATURE:
<223> OTHER INFORMATION: pYUB_inv_F primer

<400> SEQUENCE: 18
gacatccaat tgtcacagcg gacctctatt c                                   31

<210> SEQ ID NO 19
<211> LENGTH: 32
<212> TYPE: DNA
<213> ORGANISM: Artificial Sequence
<220> FEATURE:
<223> OTHER INFORMATION: pYUB_inv_R primer

<400> SEQUENCE: 19
gatctccata tgaactggcg cagttcctct gg                                  32

<210> SEQ ID NO 20
<211> LENGTH: 29
<212> TYPE: DNA
<213> ORGANISM: Artificial Sequence
<220> FEATURE:
<223> OTHER INFORMATION: BCG3043_RF_F primer

<400> SEQUENCE: 20
gatctcaagc tttccttcca attcgaatc                                      29

<210> SEQ ID NO 21
<211> LENGTH: 29
<212> TYPE: DNA
<213> ORGANISM: Artificial Sequence
<220> FEATURE:
<223> OTHER INFORMATION: BCG3043_RF_R primer

<400> SEQUENCE: 21
gatctcacta gttggtggcg acgaatttc                                      29

<210> SEQ ID NO 22
<211> LENGTH: 29
<212> TYPE: DNA
<213> ORGANISM: Artificial Sequence
```

<220> FEATURE:
<223> OTHER INFORMATION: BCG3043_LF_F primer

<400> SEQUENCE: 22
gatctcctta agccaaccac gccacatac                                29

<210> SEQ ID NO 23
<211> LENGTH: 29
<212> TYPE: DNA
<213> ORGANISM: Artificial Sequence
<220> FEATURE:
<223> OTHER INFORMATION: BCG3043_LF_R primer

<400> SEQUENCE: 23
gatctctcta gatgctcgga atgaaaagg                                29

<210> SEQ ID NO 24
<211> LENGTH: 29
<212> TYPE: DNA
<213> ORGANISM: Artificial Sequence
<220> FEATURE:
<223> OTHER INFORMATION: MPB70/83_RF_F primer

<400> SEQUENCE: 24
gatctcaagc ttatgcctcc ggcgtaatc                                29

<210> SEQ ID NO 25
<211> LENGTH: 29
<212> TYPE: DNA
<213> ORGANISM: Artificial Sequence
<220> FEATURE:
<223> OTHER INFORMATION: MPB70/3_RF_R primer

<400> SEQUENCE: 25
gatctcacta gtgagccctg accatttcc                                29

<210> SEQ ID NO 26
<211> LENGTH: 28
<212> TYPE: DNA
<213> ORGANISM: Artificial Sequence
<220> FEATURE:
<223> OTHER INFORMATION: MPB70/83_LF_F primer

<400> SEQUENCE: 26
gatctcctta aggctcgtca gcgacggc                                 28

<210> SEQ ID NO 27
<211> LENGTH: 29
<212> TYPE: DNA
<213> ORGANISM: Artificial Sequence
<220> FEATURE:
<223> OTHER INFORMATION: MPB70/83_LF_R primer

<400> SEQUENCE: 27
gatctctcta gaaccagtga ttcggagtg                                29

<210> SEQ ID NO 28
<211> LENGTH: 30
<212> TYPE: DNA
<213> ORGANISM: Artificial Sequence
<220> FEATURE:
<223> OTHER INFORMATION: BCG3679/80_RF_F primer

<400> SEQUENCE: 28
gatctcaagc ttcctgacca cgtttgctgc                               30

<210> SEQ ID NO 29
<211> LENGTH: 30
<212> TYPE: DNA
<213> ORGANISM: Artificial Sequence
<220> FEATURE:
<223> OTHER INFORMATION: BCG3679/80_RF_R primer

<400> SEQUENCE: 29
gatctcacta gtcgtgctct attaatgctg                              30

<210> SEQ ID NO 30
<211> LENGTH: 31
<212> TYPE: DNA
<213> ORGANISM: Artificial Sequence
<220> FEATURE:
<223> OTHER INFORMATION: BCG3679/80_LF_F primer

<400> SEQUENCE: 30
gatctcctta agtctatcag taggcggcta g                            31

<210> SEQ ID NO 31
<211> LENGTH: 30
<212> TYPE: DNA
<213> ORGANISM: Artificial Sequence
<220> FEATURE:
<223> OTHER INFORMATION: BCG3645/46_LF_R primer

<400> SEQUENCE: 31
gatctctcta gaaactgcgc tgcgacaatg                              30

<210> SEQ ID NO 32
<211> LENGTH: 20
<212> TYPE: DNA
<213> ORGANISM: Artificial Sequence
<220> FEATURE:
<223> OTHER INFORMATION: BCG3043_RF_CHK_F primer

<400> SEQUENCE: 32
gtcgttgcag agtgcggtgg                                         20

<210> SEQ ID NO 33
<211> LENGTH: 21
<212> TYPE: DNA
<213> ORGANISM: Artificial Sequence
<220> FEATURE:
<223> OTHER INFORMATION: BCG3043_LF_CHK_R primer

<400> SEQUENCE: 33
ccaataatgt tgaaacccag g                                       21

<210> SEQ ID NO 34
<211> LENGTH: 17
<212> TYPE: DNA
<213> ORGANISM: Artificial Sequence
<220> FEATURE:
<223> OTHER INFORMATION: MPB70/83_RF_CHK_F primer

<400> SEQUENCE: 34
ccagcgattc cttgttg                                            17

<210> SEQ ID NO 35
<211> LENGTH: 20
<212> TYPE: DNA
<213> ORGANISM: Artificial Sequence
<220> FEATURE:
<223> OTHER INFORMATION: MPB70/83_LF_CHK_R primer

<400> SEQUENCE: 35
caaaacacga acaagtgagg                                                    20

<210> SEQ ID NO 36
<211> LENGTH: 15
<212> TYPE: DNA
<213> ORGANISM: Artificial Sequence
<220> FEATURE:
<223> OTHER INFORMATION: BCG3679/80_RF_ CHK_ F primer

<400> SEQUENCE: 36
aaatcgcgta cgtgg                                                         15

<210> SEQ ID NO 37
<211> LENGTH: 18
<212> TYPE: DNA
<213> ORGANISM: Artificial Sequence
<220> FEATURE:
<223> OTHER INFORMATION: BCG3679/80_ RF_CHK_R primer

<400> SEQUENCE: 37
gaagtgcacg cagttgcc                                                      18

<210> SEQ ID NO 38
<211> LENGTH: 20
<212> TYPE: DNA
<213> ORGANISM: Artificial Sequence
<220> FEATURE:
<223> OTHER INFORMATION: BCG3679/80_LF_CHK_F primer

<400> SEQUENCE: 38
caagttgacc agtgccgttc                                                    20

<210> SEQ ID NO 39
<211> LENGTH: 18
<212> TYPE: DNA
<213> ORGANISM: Artificial Sequence
<220> FEATURE:
<223> OTHER INFORMATION: BCG3679/80_LF_CHK_ R primer

<400> SEQUENCE: 39
caattgagtc atccagcg                                                      18

<210> SEQ ID NO 40
<211> LENGTH: 258
<212> TYPE: PRT
<213> ORGANISM: Escherichia coli

<400> SEQUENCE: 40

Met Lys Asn Ile Thr Phe Ile Phe Phe Ile Leu Leu Ala Ser Pro Leu
1               5                   10                  15

Tyr Ala Asn Gly Asp Arg Leu Tyr Arg Ala Asp Ser Arg Pro Pro Asp
                20                  25                  30

Glu Ile Lys Arg Ser Gly Gly Leu Met Pro Arg Gly His Asn Glu Tyr
            35                  40                  45

Phe Asp Arg Gly Thr Gln Met Asn Ile Asn Leu Tyr Asp His Ala Arg
        50                  55                  60

Gly Thr Gln Thr Gly Phe Val Arg Tyr Asp Asp Gly Tyr Val Ser Thr
65                  70                  75                  80

Ser Leu Ser Leu Arg Ser Ala His Leu Ala Gly Gln Ser Ile Leu Ser
                85                  90                  95

```
Gly Tyr Ser Thr Tyr Tyr Ile Tyr Val Ile Ala Thr Ala Pro Asn Met
            100             105             110

Phe Asn Val Asn Asp Val Leu Gly Val Tyr Ser Pro His Pro Tyr Glu
        115             120             125

Gln Glu Val Ser Ala Leu Gly Gly Ile Pro Tyr Ser Gln Ile Tyr Gly
    130             135             140

Trp Tyr Arg Val Asn Phe Gly Val Ile Asp Glu Arg Leu His Arg Asn
145             150             155             160

Arg Glu Tyr Arg Asp Arg Tyr Tyr Arg Asn Leu Asn Ile Ala Pro Ala
                165             170             175

Glu Asp Gly Tyr Arg Leu Ala Gly Phe Pro Pro Asp His Gln Ala Trp
            180             185             190

Arg Glu Glu Pro Trp Ile His His Ala Pro Gln Gly Cys Gly Asn Ser
        195             200             205

Ser Arg Thr Ile Thr Gly Asp Thr Cys Asn Glu Glu Thr Gln Asn Leu
    210             215             220

Ser Thr Ile Tyr Leu Arg Glu Tyr Gln Ser Lys Val Lys Arg Gln Ile
225             230             235             240

Phe Ser Asp Tyr Gln Ser Glu Val Asp Ile Tyr Asn Arg Ile Arg Asp
            245             250             255

Glu Leu
```